(12) United States Patent  (10) Patent No.: US 8,897,791 B2
Ebara et al.  (45) Date of Patent: Nov. 25, 2014

(54) MOBILE STATION, NETWORK, AND HANDOVER CONTROL METHOD

(75) Inventors: Hidetoshi Ebara, Kawasaki (JP); Masato Maeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 125 days.

(21) Appl. No.: 13/505,478

(22) PCT Filed: Sep. 17, 2010

(86) PCT No.: PCT/JP2010/066169
§ 371 (c)(1), (2), (4) Date: May 2, 2012

(87) PCT Pub. No.: WO2011/058820
PCT Pub. Date: May 19, 2011

(65) Prior Publication Data
US 2012/0220302 A1  Aug. 30, 2012

(30) Foreign Application Priority Data
Nov. 10, 2009  (JP) .................................. 2009-256869

(51) Int. Cl.
*H04W 36/00* (2009.01)
*H04W 64/00* (2009.01)
*H04W 28/18* (2009.01)
*H04W 36/06* (2009.01)
*H04W 24/10* (2009.01)

(52) U.S. Cl.
CPC ............ *H04W 64/006* (2013.01); *H04W 28/18* (2013.01); *H04W 36/06* (2013.01); *H04W 24/10* (2013.01)
USPC ............ 455/441; 455/436; 455/437; 455/447

(58) Field of Classification Search
None
See application file for complete search history.

(56) References Cited

U.S. PATENT DOCUMENTS

| 2004/0029588 | A1 | 2/2004 | Kikuma et al. |
| 2009/0029710 | A1* | 1/2009 | Ochiai et al. ................. 455/450 |
| 2010/0216481 | A1* | 8/2010 | Gormley ....................... 455/450 |
| 2011/0039558 | A1* | 2/2011 | Lee et al. ...................... 455/434 |
| 2011/0287768 | A1* | 11/2011 | Takamatsu et al. ........... 455/444 |

FOREIGN PATENT DOCUMENTS

| CN | 101116363 A | 1/2008 |
| EP | 1 850 610 A1 | 10/2007 |
| JP | 2004 48528 | 2/2004 |
| JP | 2005-311498 A | 11/2005 |
| WO | 2006 088082 | 8/2006 |
| WO | WO 2009/023228 A1 | 2/2009 |

OTHER PUBLICATIONS

Japanese Office Action issued May 7, 2013 in Patent Application No. 2009-256869 with English Translation.

(Continued)

*Primary Examiner* — Suhail Khan
(74) *Attorney, Agent, or Firm* — Oblon, Spivak, McClelland, Maier & Neustadt, L.L.P.

(57) ABSTRACT

In a parameter storage device, an offset value corresponding to a moving state (moving speed) and a serving frequency are stored. A parameter identifier reads from the parameter storage device an offset value corresponding to a serving frequency and a moving state. A measuring unit measures a radio communication quality of an inter-frequency cell. A measurement controller adds the offset value to the radio communication quality, to generate control information. The control information is transmitted via a transmitter to a network.

8 Claims, 23 Drawing Sheets

(56) References Cited

OTHER PUBLICATIONS

International Search Report Issued Dec. 21, 2010 in PCT/JP10/66169 Filed Sep. 17, 2010.

Combined Chinese Office Action and Search Report issued Mar. 17, 2014 in Patent Application No. 201080050786.8 (with English language translation).

* cited by examiner

FIG. 3A

| MOVING STATE (MOVING SPEED) | OFFSET VALUE OF RADIO COMMUNICATION QUALITY Ec/N0 [dB] | | | |
|---|---|---|---|---|
| | f1 | f2 | ... | fn |
| EXTREMELY HIGH SPEED (EQUAL TO OR GREATER THAN 250 km/h) | X1=−30 | X1=−15 | ... | X1=−15 |
| HIGH SPEED (EQUAL TO OR GREATER THAN 150 km/h AND LESS THAN 250 km/h) | X2=−20 | X2=−10 | ... | X2=−10 |
| MEDIUM SPEED (EQUAL TO OR GREATER THAN 100 km/h AND LESS THAN 150 km/h) | X3=−10 | X3=−5 | ... | X3=−5 |
| LOW SPEED (EQUAL TO OR GREATER THAN 50 km/h AND LESS THAN 100 km/h) | X4=0 | X4=0 | ... | X4=0 |
| STOPPED (LESS THAN 50 km/h) | X5=0 | X5=0 | ... | X5=0 |

FIG. 3B

| MOVING STATE (MOVING SPEED) | OFFSET VALUE OF RADIO COMMUNICATION QUALITY Ec/N0 [dB] | |
|---|---|---|
| | f1 | f2 – fn |
| EXTREMELY HIGH SPEED (EQUAL TO OR GREATER THAN 250 km/h) | X1=−30 | X1=−15 |
| HIGH SPEED (EQUAL TO OR GREATER THAN 150 km/h AND LESS THAN 250 km/h) | X2=−20 | X2=−10 |
| MEDIUM SPEED (EQUAL TO OR GREATER THAN 100 km/h AND LESS THAN 150 km/h) | X3=−10 | X3=−5 |
| LOW SPEED (EQUAL TO GREATER THAN 50 km/h AND LESS THAN 100 km/h) | X4=0 | X4=0 |
| STOPPED (LESS THAN 50 km/h) | X5=0 | X5=0 |

FIG. 6A

| MOVING STATE (MOVING SPEED) | INTER-FREQUENCY MEASUREMENT START THRESHOLD S-intersearch[dB] | | | |
|---|---|---|---|---|
| | f1 | f2 | ... | fn |
| EXTREMELY HIGH SPEED (EQUAL TO OR GREATER THAN 250 km/h) | X1=−20 | X1=−10 | ... | X1=−10 |
| HIGH SPEED (EQUAL TO OR GREATER THAN 150 km/h AND LESS THAN 250 km/h) | X2=−20 | X2=−10 | ... | X2=−10 |
| MEDIUM SPEED (EQUAL TO OR GREATER THAN 100 km/h AND LESS THAN 150 km/h) | X3=−15 | X3=−7.5 | ... | X3=−7.5 |
| LOW SPEED (EQUAL TO GREATER THAN 50 km/h AND LESS THAN 100 km/h) | X4=−13 | X4=−5 | ... | X4=−5 |
| STOPPED (LESS THAN 50 km/h) | X5=−10 | X5=0 | ... | X5=0 |

FIG. 6B

| MOVING STATE (MOVING SPEED) | INTER-FREQUENCY MEASUREMENT START THRESHOLD S-intersearch[dB] | |
|---|---|---|
| | f1 | f2 – fn |
| EXTREMELY HIGH SPEED (EQUAL TO OR GREATER THAN 250 km/h) | X1=−20 | X1=−10 |
| HIGH SPEED (EQUAL TO OR GREATER THAN 150 km/h AND LESS THAN 250 km/h) | X2=−20 | X2=−10 |
| MEDIUM SPEED (EQUAL TO OR GREATER THAN 100 km/h AND LESS THAN 150 km/h) | X3=−15 | X3=−7.5 |
| LOW SPEED (EQUAL TO OR GREATER THAN 50 km/h AND LESS THAN 100 km/h) | X4=−13 | X4=−5 |
| STOPPED (LESS THAN 50 km/h) | X5=−10 | X5=0 |

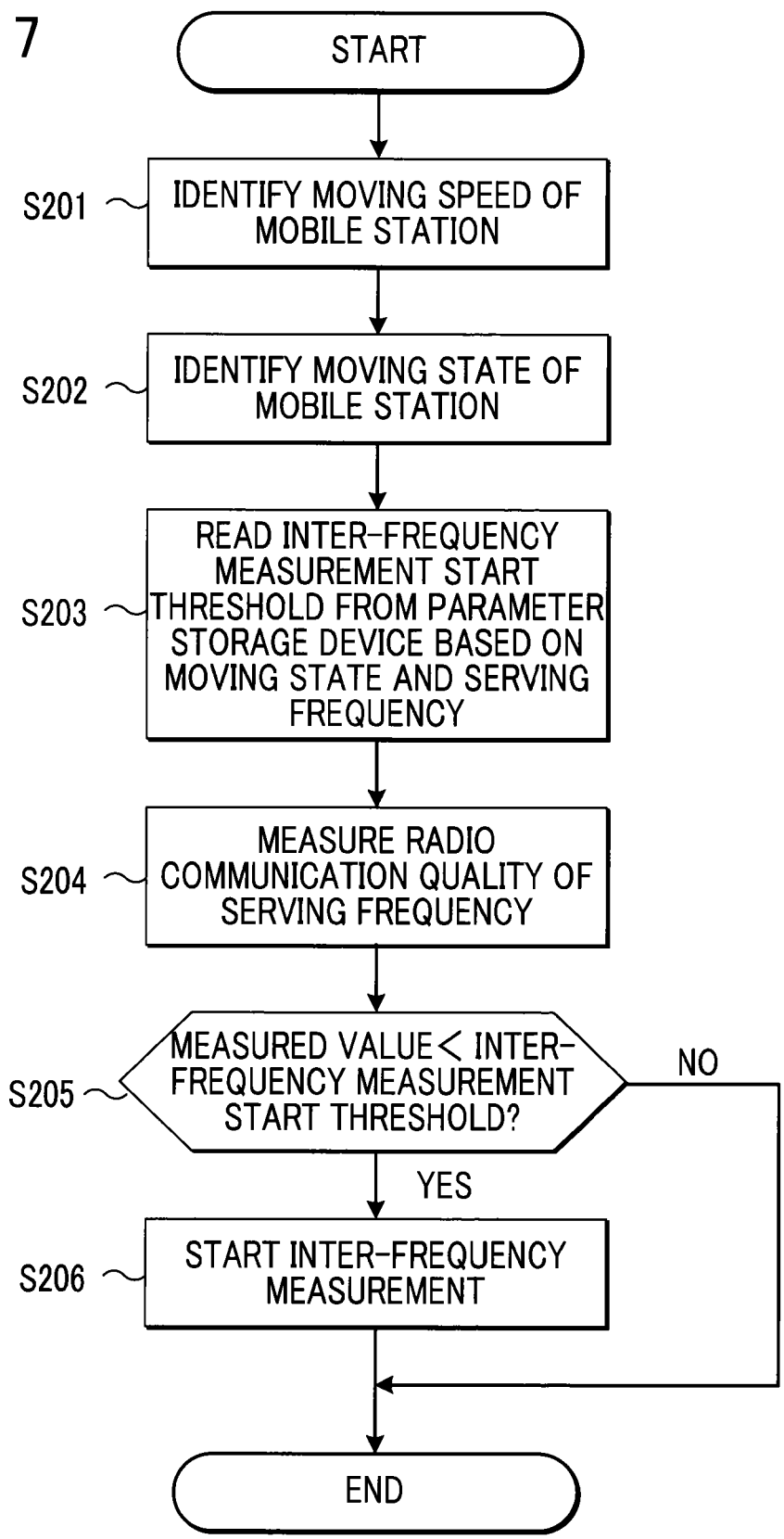

FIG. 8A

| MOVING STATE (MOVING SPEED) | THE NUMBER OF TIMES OF REPORTS PER UNIT TIME OF INTER-FREQUENCY MEASUREMENT RESULTS | | | |
|---|---|---|---|---|
| | f1 | f2 | ... | fn |
| EXTREMELY HIGH SPEED (EQUAL TO OR GREATER THAN 250 km/h) | NO | NO | ... | NO |
| HIGH SPEED (EQUAL TO OR GREATER THAN 150 km/h AND LESS THAN 250 km/h) | NO | YES | ... | YES |
| MEDIUM SPEED (EQUAL TO OR GREATER THAN 100 km/h AND LESS THAN 150 km/h) | YES | YES | ... | YES |
| LOW SPEED (EQUAL TO OR GREATER THAN 50 km/h AND LESS THAN 100 km/h) | YES | YES | ... | YES |
| STOPPED (LESS THAN 50 km/h) | YES | YES | ... | YES |

FIG. 8B

| MOVING STATE (MOVING SPEED) | THE NUMBER OF TIMES OF REPORTS PER UNIT TIME OF INTER-FREQUENCY MEASUREMENT RESULTS | |
|---|---|---|
| | f1 | f2 – fn |
| EXTREMELY HIGH SPEED (EQUAL TO OR GREATER THAN 250 km/h) | NO | NO |
| HIGH SPEED (EQUAL TO OR GREATER THAN 150 km/h AND LESS THAN 250 km/h) | NO | YES |
| MEDIUM SPEED (EQUAL TO OR GREATER THAN 100 km/h AND LESS THAN 150 km/h) | YES | YES |
| LOW SPEED (EQUAL TO OR GREATER THAN 50 km/h AND LESS THAN 100 km/h) | YES | YES |
| STOPPED (LESS THAN 50 km/h) | YES | YES |

FIG. 10

| MOVING STATE (MOVING SPEED) | OFFSET VALUE OF RADIO COMMUNICATION QUALITY Ec/N0 [dB] | |
|---|---|---|
| | PRIORITY FREQUENCY | OTHER FREQUENCY |
| EXTREMELY HIGH SPEED (EQUAL TO OR GREATER THAN 250 km/h) | X1=−30 | X1=−15 |
| HIGH SPEED (EQUAL TO OR GREATER THAN 150 km/h AND LESS THAN 250 km/h) | X2=−20 | X2=−10 |
| MEDIUM SPEED (EQUAL TO OR GREATER THAN 100 km/h AND LESS THAN 150 km/h) | X3=−10 | X3=−5 |
| LOW SPEED (EQUAL TO OR GREATER THAN 50 km/h AND LESS THAN 100 km/h) | X4=0 | X4=0 |
| STOPPED (LESS THAN 50 km/h) | X5=0 | X5=0 |

FIG. 13A

| MOVING STATE (MOVING SPEED) | BASE STATION TRANSMISSION POWER THRESHOLD [dBm] | | | |
|---|---|---|---|---|
| | f1 | f2 | ... | fn |
| EXTREMELY HIGH SPEED (EQUAL TO OR GREATER THAN 250 km/h) | X1=30 | X1=26 | ... | X1=26 |
| HIGH SPEED (EQUAL TO OR GREATER THAN 150 km/h AND LESS THAN 250 km/h) | X2=26 | X2=23 | ... | X2=23 |
| MEDIUM SPEED (EQUAL TO OR GREATER THAN 100 km/h AND LESS THAN 150 km/h) | X3=23 | X3=20 | ... | X3=20 |
| LOW SPEED (EQUAL TO GREATER THAN 50 km/h AND LESS THAN 100 km/h) | X4=20 | X4=20 | ... | X4=20 |
| STOPPED (LESS THAN 50 km/h) | X5=20 | X5=20 | ... | X5=20 |

FIG. 13B

| MOVING STATE (MOVING SPEED) | BASE STATION TRANSMISSION POWER THRESHOLD [dBm] | |
| --- | --- | --- |
| | f1 | f2 – fn |
| EXTREMELY HIGH SPEED (EQUAL TO OR GREATER THAN 250 km/h) | X1=30 | X1=26 |
| HIGH SPEED (EQUAL TO OR GREATER THAN 150 km/h AND LESS THAN 250 km/h) | X2=26 | X2=23 |
| MEDIUM SPEED (EQUAL TO OR GREATER THAN 100 km/h AND LESS THAN 150 km/h) | X3=23 | X3=20 |
| LOW SPEED (EQUAL TO OR GREATER THAN 50 km/h AND LESS THAN 100 km/h) | X4=20 | X4=20 |
| STOPPED (LESS THAN 50 km/h) | X5=20 | X5=20 |

FIG. 15A

| MOVING STATE (MOVING SPEED) | COMPRESSED MODE ACTIVATION NOTIFICATION | | | |
| --- | --- | --- | --- | --- |
| | f1 | f2 | ... | fn |
| EXTREMELY HIGH SPEED (EQUAL TO OR GREATER THAN 250 km/h) | NO | NO | ... | NO |
| HIGH SPEED (EQUAL TO OR GREATER THAN 150 km/h AND LESS THAN 250 km/h) | NO | YES | ... | YES |
| MEDIUM SPEED (EQUAL TO OR GREATER THAN 100 km/h AND LESS THAN 150 km/h) | YES | YES | ... | YES |
| LOW SPEED (EQUAL TO GREATER THAN 50 km/h AND LESS THAN 100 km/h) | YES | YES | ... | YES |
| STOPPED (LESS THAN 50 km/h) | YES | YES | ... | YES |

FIG. 15B

| MOVING STATE (MOVING SPEED) | COMPRESSED MODE ACTIVATION NOTIFICATION | |
|---|---|---|
| | f1 | f2 – fn |
| EXTREMELY HIGH SPEED (EQUAL TO OR GREATER THAN 250 km/h) | NO | NO |
| HIGH SPEED (EQUAL TO OR GREATER THAN 150 km/h AND LESS THAN 250 km/h) | NO | YES |
| MEDIUM SPEED (EQUAL TO OR GREATER THAN 100 km/h AND LESS THAN 150 km/h) | YES | YES |
| LOW SPEED (EQUAL TO OR GREATER THAN 50 km/h AND LESS THAN 100 km/h) | YES | YES |
| STOPPED (LESS THAN 50 km/h) | YES | YES |

FIG. 17A

| MOVING STATE (MOVING SPEED) | OFFSET VALUE OF ACTIVATION THRESHOLD [dB] | | | |
| --- | --- | --- | --- | --- |
| | f1 | f2 | ... | fn |
| EXTREMELY HIGH SPEED (EQUAL TO OR GREATER THAN 250 km/h) | X1=12 | X1=6 | ... | X1=6 |
| HIGH SPEED (EQUAL TO OR GREATER THAN 150 km/h AND LESS THAN 250 km/h) | X2=6 | X2=3 | ... | X2=3 |
| MEDIUM SPEED (EQUAL TO OR GREATER THAN 100 km/h AND LESS THAN 150 km/h) | X3=3 | X3=0 | ... | X3=0 |
| LOW SPEED (EQUAL TO GREATER THAN 50 km/h AND LESS THAN 100 km/h) | X4=0 | X4=0 | ... | X4=0 |
| STOPPED (LESS THAN 50 km/h) | X5=0 | X5=0 | ... | X5=0 |

FIG. 17B

| MOVING STATE (MOVING SPEED) | OFFSET VALUE OF ACTIVATION THRESHOLD [dB] | |
| --- | --- | --- |
| | f1 | f2 – fn |
| EXTREMELY HIGH SPEED (EQUAL TO OR GREATER THAN 250 km/h) | X1=12 | X1=6 |
| HIGH SPEED (EQUAL TO OR GREATER THAN 150 km/h AND LESS THAN 250 km/h) | X2=6 | X2=3 |
| MEDIUM SPEED (EQUAL TO OR GREATER THAN 100 km/h AND LESS THAN 150 km/h) | X3=3 | X3=0 |
| LOW SPEED (EQUAL TO GREATER THAN 50 km/h AND LESS THAN 100 km/h) | X4=0 | X4=0 |
| STOPPED (LESS THAN 50 km/h) | X5=0 | X5=0 |

MOBILE STATION, NETWORK, AND HANDOVER CONTROL METHOD

TECHNICAL FIELD

The present invention relates to a mobile station, a network and a handover control method for use in an inter-frequency handover.

BACKGROUND ART

In a mobile communication system, an area where a service is provided is divided into plural cells, and a base station is placed in each of the plural cells. When a mobile station moves across cells, the mobile station switches a base station that is a communication counterpart to another base station. When a mobile station switches to a base station with which it communicates to another base station, this is called a "handover". There are different types of handover: an "intra-frequency handover", or a "soft handover", in which communication frequencies before and after switching are the same, and an "inter-frequency handover" in which communication frequencies before and after switching are different.

The inter-frequency handover has a higher probability of being subject to a call disconnection and requires greater power consumption than the intra-frequency handover.

The inter-frequency handover includes: (1) a method in which, after a network determines that the inter-frequency handover should be implemented and transmits an inter-frequency handover execution notification to a mobile station, the inter-frequency handover is implemented at the mobile station and at the network; and (2) a method in which, after a mobile station determines that the inter-frequency handover should be implemented and transmits an inter-frequency handover execution notification to a network, the inter-frequency handover is implemented at the mobile station and at the network. In either method, the implementation of the inter-frequency handover is determined based on a measurement result of a transmission power at a base station or a result of a measurement (hereinafter referred to also as "inter-frequency measurement") of a radio communication quality of an inter-frequency cell (different-frequency cell) measured at a mobile station. For example, we assume a case in which a mobile station communicates with a base station at a frequency f1 and the mobile station communicates with a next base station at a frequency f2. For example, the inter-frequency handover can be implemented in conditions in which the difference between the radio communication quality at frequency f1 and the radio communication quality at frequency f2 exceeds a threshold.

Patent Document 1 describes, as a control method for such an inter-frequency handover, a technique for implementing an inter-frequency handover, having considered a moving speed of a mobile station. Specifically, a moving speed of a mobile station is measured, and a threshold is changed depending on the moving speed. According to this technique, the threshold is made higher as the moving speed becomes greater, such that the number of times of implementing the inter-frequency handover can be reduced in a case in which the moving speed is high.

CITATION LIST

Patent Document

Patent Document 1: Japanese Patent Application Laid-Open Publication No. 2004-48528

SUMMARY OF INVENTION

Technical Problem

A mobile station moving at a high speed moves across many cells in a short period. In a network, some frequencies can be used in common in the next cell, but others cannot. Because the above conventional technique merely controls so that the inter-frequency handover is reduced as the moving speed increases, a serving frequency will eventually be unusable in a case in which the mobile station communicates with a base station by using a frequency that cannot be used in common in many cells, and the inter-frequency handover will be implemented. However, even after this inter-frequency handover is implemented, the frequency after the handover is not necessarily a frequency that can be communicable in common among many cells.

Thus, in the conventional technique, there was a problem that the inter-frequency handover cannot be sufficiently reduced.

The present invention was made in consideration of the above-described situations, and has, as an object, to provide a mobile station, a network and a handover control method that enable sufficient reduction of inter-frequency handover.

Solution to Problem

To solve the problem above, a mobile station according to the present invention is for communicating with a network having plural base stations, and has a speed identifier that identifies a speed of the mobile station; a controller that generates control information required by the network in implementing an inter-frequency handover; and a transmitter that transmits the control information to the network, and the mobile station and the network can communicate with each other by using one of plural frequencies including a predetermined priority frequency to be used with priority, and when a serving frequency currently being used to communicate with the network is the priority frequency and when the moving speed exceeds a reference speed, the controller changes at least one of a content of the control information and a number of times per unit time of transmitting the control information to the network.

According to the present invention, in a case in which the mobile station is communicating with the network with the priority frequency, the content of control information and the number of times per unit time of transmitting the control information to the network is changed when the moving speed exceeds the reference speed. Therefore, in a case in which the priority frequency is used for communication, the inter-frequency handover can be reduced. As a result, the processing load for the handover can be reduced at the mobile station and at the network, and furthermore, the power consumption of the mobile station can be reduced, so that use of the battery can be reduced.

Preferably, when the current serving frequency for communicating with the network is the priority frequency, and when the moving speed exceeds the reference speed, the controller may change at least one of the content of the control information and the number of times per unit time the control information is transmitted to the network so that communication using the priority frequency is more likely to be continued than in a case in which another frequency is being used for communication. Because the current serving frequency for communicating with the network is the priority frequency, "communication using the priority frequency is more likely to be continued" means that the intra-frequency handover is more likely to be implemented than the inter-frequency handover. Supposedly, if the control information had no relationship with the inter-frequency handover, changing the content thereof will not affect the implementation of the inter-frequency handover. However, the control information of the present invention is information required for the network to implement the inter-frequency handover. Therefore, changing the content thereof enables the controlling of the implementation of the inter-frequency handover. An example of such control information is a radio communication quality of an inter-frequency cell measured at a mobile station. In this case, changing control information so that the priority frequency is more likely to be continued means changing the radio communication quality of an inter-frequency cell to a worse value than an actual measurement value. As a result, because the network will consider that a good radio communication quality cannot be maintained even if the inter-frequency handover is implemented, the network will select the intra-frequency handover.

Furthermore, when the control information is transmitted from the mobile station, the network will decide whether to implement the inter-frequency handover based on the control information. Therefore, in a case in which the number of times per unit time of transmitting the control information to the network is low, it is less likely that the inter-frequency handover will be implemented than in a case in which the number of times is high.

"Changing the number of times per unit time of transmitting the control information to the network so that communication using the priority frequency is more likely to be continued" means that the number of times per unit time of transmitting the control information to the network is made lower compared to a case in which another frequency is being used for communication. Changing the number of times per unit time of transmitting the control information to the network can be either direct or indirect. For example, directly changing the number of times per unit time includes changing to transmit or not to transmit the control information or changing the transmission cycle. Indirectly changing includes changing a predetermined condition in a case in which satisfying the predetermined condition is a necessary condition for transmitting the control information. An example of a predetermined condition is the changing of an inter-frequency measurement start threshold. The inter-frequency measurement start threshold is the radio communication quality of a current serving frequency used for communication, and this current radio communication quality will be a trigger for measuring the radio communication quality of an inter-frequency cell. That is, when the radio communication quality of the current serving frequency becomes less than the inter-frequency measurement start threshold, the measurement of the radio communication quality of an inter-frequency cell is started. For example, if the measurement start threshold is lowered, it is less likely that the measurement of the radio communication quality of an inter-frequency cell is started than a case in which the inter-frequency measurement start threshold is not lowered. Therefore, the number of times per unit time of transmitting control information to the network is reduced. As a result, the implementation of the inter-frequency handover is suppressed.

The speed identifier may measure the moving speed of the mobile station or may obtain one from the network. The predetermined speed may be appropriately determined. Furthermore, the priority frequency may be one, or two, or more. For example, when frequencies used in a service area are f1 to fn and when frequencies f1 and f2 are usable in common in a greater number of cells, frequencies f1 and f2 can be priority frequencies. More specifically, a frequency usable in common in the greatest number of cells and a frequency usable in common in the second greatest number of cells can be the above two priority frequencies. Furthermore, in a case in which the priority frequency is one, the priority frequency may be a frequency usable in every cell in common, but is not necessarily usable in every cell in common, and may be a frequency usable in some of the cells. For example, a frequency usable in common in the greatest number of cells may be the priority frequency.

Preferably, in the above mobile station, the controller may have: a parameter storage device for storing, for each of the plural frequencies, a parameter in correspondence with the moving speed, the parameter being used for at least one of generating the control information and controlling the number of times per unit time of transmitting the control information to the network; and a changer that reads from the parameter storage device a parameter corresponding to the moving speed and the serving frequency and that changes at least one of the content of the control information and the number of times per unit time of transmitting the control information to the network.

In this case, because the parameter storage device stores for each frequency the parameter in correspondence with the moving speed, it is possible to read, from the parameter storage device, the parameter corresponding to the current serving frequency and the moving speed. The parameter storage device is preferably a non-volatile memory and may be rewritable or non-rewritable. Furthermore, "storing for each of plural frequencies" includes a case in which the relationship between the parameter and the moving speed is different depending on a frequency, or a case in which, when the relationship between the parameter and the moving speed are common to plural frequencies, the relationship can be stored for the plural frequencies as a whole.

Furthermore, the parameter stored in the parameter storage device is preferably set so that the communication using the priority frequency is likely to be continued. Here, the meaning of "the communication using the priority frequency is likely to be continued" is as described above.

Preferably, the above mobile station may further have a receiver that receives, from a communicating base station, priority frequency information indicating the priority frequency, and the controller may have: a parameter storage device that stores a parameter in correspondence with the moving speed, the parameter being used for at least one of generating the control information and controlling the number of times per unit time of transmitting the control information to the network, the parameter stored in the parameter storage device being different between the priority frequency and another frequency; a determiner that determines whether a serving frequency currently being used to communicate with the network is the priority frequency; and a changer that reads a parameter from the parameter storage device based on a determination result of the determiner and the moving speed, and that changes at least one of the content of the control information and the number of times per unit time of transmitting the control information to the network.

In this case, because the priority frequency can be obtained from the network, it is possible to respond to a case in which a once determined priority frequency is changed due to the system updating. Also, because it is possible to change the priority frequency for different regions, the freedom in setting the priority frequency is considerably enhanced.

Preferably, the above mobile station may further have a measurer that measures a radio communication quality to output the measured value, and the parameter may be an offset value of the radio communication quality, the control information may be the measured value; and the changer may change the content of the control information by correcting the measured value with the offset value.

According to the present invention, in order to determine whether to implement the inter-frequency handover at the network, the measured value of the radio communication quality of an inter-frequency cell received at the mobile station is reported to the network. This measured value is corrected by using the offset value of the radio communication quality read from the parameter storage device, whereby it is possible to report to the network the radio communication quality of the inter-frequency cell as a value that is worse than the actual measurement value. As a result, it is possible for the network to suppress the implementation of the inter-frequency handover for the mobile station that is in communication using the priority frequency and is moving at a high speed.

Preferably, in the above mobile station, the parameter may be an inter-frequency measurement start threshold that is a reference for starting a measurement of a radio communication quality of an inter-frequency cell. In this case, the inter-frequency measurement start threshold, as the parameter, is used for controlling the number of times per unit time of transmission to the network. Specifically, the inter-frequency measurement start threshold of the priority frequency has been set smaller than the inter-frequency measurement start threshold of another frequency. Accordingly, in a case in which the serving frequency is the priority frequency, the inter-frequency measurement start threshold that is less than that for another frequency is read. As a result, even in a case in which the radio communication quality is degraded during communicating with the network using the priority frequency, the measurement of the radio communication quality is not started as long as the radio communication quality does not fall below the inter-frequency measurement start threshold. Therefore, because the number of times per unit time of transmitting the control information is reduced, the implementation of the inter-frequency handover is reduced.

Additionally, a network according to the present invention is for performing communication with a mobile station with plural frequencies including a priority frequency used with high priority, and has: a speed identifier that identifies a moving speed of the mobile station; a frequency obtainer that obtains a serving frequency being used to communicate with the mobile station; and a changer that changes an implementation condition for an inter-frequency handover based on the serving frequency and the moving speed.

According to the present invention, a serving frequency is identified, and the implementation condition of the inter-frequency handover is changed based on the serving frequency and the moving speed. As a result, by suppressing the implementation of the inter-frequency handover, the occurrence of call disconnections can be reduced, and the power consumption of the mobile station can be reduced.

Preferably, in a case in which the serving frequency is the priority frequency, the changer may change the implementation condition of the inter-frequency handover so that the inter-frequency handover is less likely to be implemented than in a case in which the serving frequency is another frequency. "To change the implementation condition of an inter-frequency handover so that the inter-frequency handover is less likely to be implemented" is, for example, to change a base station transmission power threshold to a greater value in a case in which the transmission power of a base station to a mobile station exceeding the base station transmission power threshold is a requisite condition for implementing the inter-frequency handover. When the base station transmission power threshold is made greater, the inter-frequency handover will not be implemented as long as the transmission power does not exceed the base station transmission power threshold even if the radio communication quality between the base station and the mobile station is degraded and the base station transmission power becomes greater. Therefore, the implementation of the inter-frequency handover can be suppressed. For example, in a case in which the network transmits to the mobile station an instruction for executing a measurement of the radio communication quality of an inter-frequency cell, it may be configured not to transmit the instruction in a case in which the serving frequency is the priority frequency and to transmit the instruction in a case in which the serving frequency is another frequency. Such an instruction includes a Compressed Mode Activate instruction for increasing the transmission rate of data so as to secure time for measuring the radio communication quality of an inter-frequency cell.

Preferably, in the above-described network, the changer may have a storage device in which, for each of the plural frequencies, an implementation condition for the inter-frequency handover and the moving speed are stored in correspondence with each other, and the changer may read from the storage device an implementation condition for the inter-frequency handover based on the serving frequency and the moving speed, to change the implementation condition for the inter-frequency handover. In this case, because an implementation condition of an inter-frequency handover is stored in a storage device, it is possible to readily change the implementation condition of the inter-frequency handover based on the determination result and the moving speed.

Additionally, a method according to the present invention is a method of controlling a handover between a network having plural base stations and a mobile station capable of communicating by using one of plural frequencies, and the plural frequencies include a predetermined priority frequency used with high priority, the method having: measuring a moving speed of the mobile station; changing, at the mobile station, at least one of the content of control information required for implementing a handover to an inter-frequency cell and the number of times per unit time of transmitting the control information to the network when a serving frequency is the priority frequency and when the moving speed exceeds a predetermined speed; and transmitting the control information from the mobile station to the network.

According to the present invention, when the mobile station is during communication using the priority frequency, and when the moving speed exceeds a predetermined speed, the content of control information and the number of times per unit time of transmitting the control information to the network are changed. Preferably, the number of times per unit time may be changed so that the communication using the priority frequency is more likely to be continued. Accordingly, in a case in which communication is performed using the priority frequency, an inter-frequency handover can be suppressed. Then, at the mobile station and at the network, the processing load for the handover can be reduced, and therefore, the power consumption of the mobile station can be reduced, and the use of the battery can be suppressed.

Additionally, a method according to the present invention is a method of controlling a handover between a network having plural base stations and a mobile station capable of communicating by using one of plural frequencies, and the plural frequencies include a predetermined priority frequency used with high priority, the method having: identifying a moving speed of the mobile station; identifying, at the network, a serving frequency being used to communicate with the mobile station; and changing, at the network, an implementation condition for an inter-frequency handover based on the moving speed and the serving frequency.

According to the present invention, the implementation condition of an inter-frequency handover can be changed based on the moving speed and the serving frequency. For example, in a case in which the serving frequency is the priority frequency, it is possible to make the implementation condition of the inter-frequency handover stricter than that for another frequency. Accordingly, the implementation of the inter-frequency handover can be suppressed, and therefore, the occurrence of call disconnections can be reduced and the power consumption of the mobile station can be reduced.

BRIEF DESCRIPTION OF THE DRAWINGS

FIG. 3A is an explanatory diagram showing a memory content of a parameter storage device 108 according to the First Embodiment.

FIG. 3B is an explanatory diagram showing a memory content of parameter storage device 108 according to the First Embodiment.

FIG. 6A is an explanatory diagram showing a memory content of parameter storage device 108 according to a modification 1 of the First Embodiment.

FIG. 6B is an explanatory diagram showing a memory content of parameter storage device 108 according to the modification 1 of the First Embodiment.

FIG. 7 is a flowchart showing an operation of an inter-frequency handover at a CPU of a mobile station according to the modification 1 of the First Embodiment.

FIG. 8A is an explanatory diagram showing a memory content of parameter storage device 108 according to a modification 2 of the First Embodiment.

FIG. 8B is an explanatory diagram showing a memory content of parameter storage device 108 according to the modification 2 of the First Embodiment.

FIG. 10 is an explanatory diagram showing a memory content of parameter storage device 108 according to a modification 4 of the First Embodiment.

FIG. 13A is an explanatory diagram showing a memory content of a parameter storage device 206 according to the Second Embodiment.

FIG. 13B is an explanatory diagram showing a memory content of a parameter storage device 206 according to the Second Embodiment.

FIG. 15A is an explanatory diagram showing a memory content of parameter storage device 206 according to a modification 1 of the Second Embodiment.

FIG. 15B is an explanatory diagram showing a memory content of parameter storage device 206 according to the modification 1 of the Second Embodiment.

FIG. 17A is an explanatory diagram showing a memory content of parameter storage device 206 according to Modification 2 of the Second Embodiment.

FIG. 17B is an explanatory diagram showing a memory content of parameter storage device 206 according to Modification 2 of the Second Embodiment.

DESCRIPTION OF EMBODIMENTS

First Embodiment

In the following, a mobile communication system including a mobile station and a network according to the present invention will be described with reference to the drawings.

Figure 1:
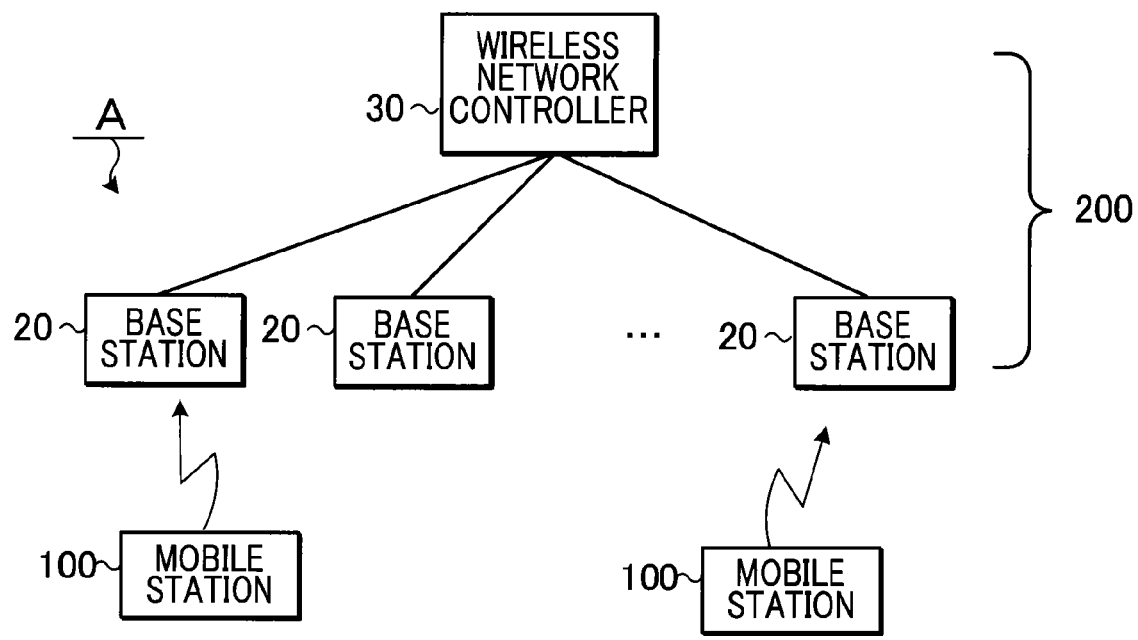
FIG. 1 is a block diagram showing a configuration of a mobile communication system.

FIG. 1 is a block diagram showing a configuration of the mobile communication system. As shown in the figure, a mobile communication system A includes plural mobile stations 100 and a network 200. Network 200 has plural base stations 20 and a wireless network controller 30. Wireless network controller 30 manages position information of each mobile station 100, and is capable of controlling a handover. In mobile communication system A, either an inter-frequency handover or an intra-frequency handover can be implemented as a handover between base stations. The intra-frequency handover can be actualized by a soft handover.

Figure 2:
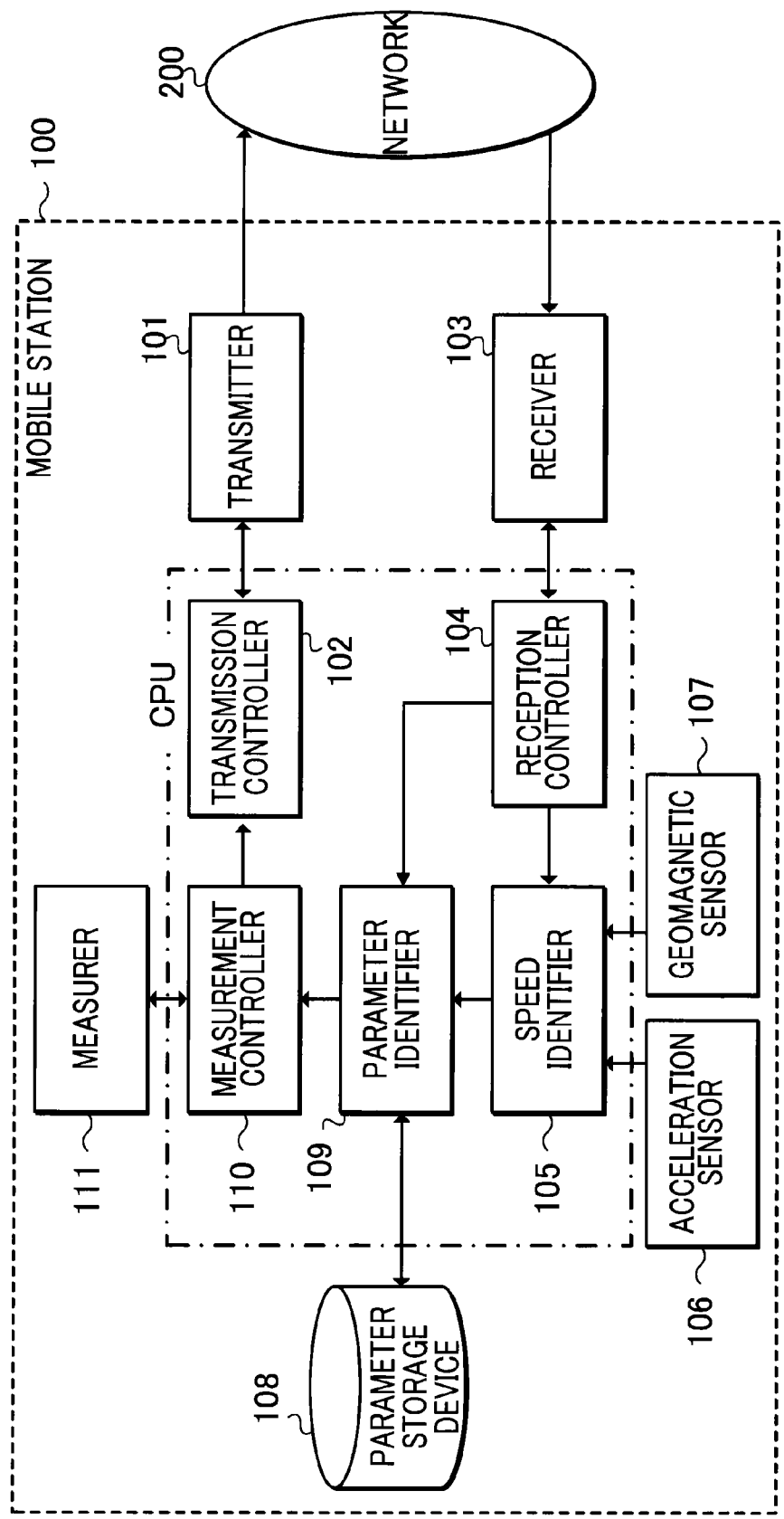
FIG. 2 is a block diagram showing a configuration of a mobile station 100 according to a First Embodiment.

FIG. 2 shows a configuration of mobile station 100. Mobile station 100 has a receiver 103 for receiving a signal from base station 20 of network 200. Receiver 103 has an antenna, an amplifier, etc. A reception controller 104 controls receiver 103 to output a received signal to a speed identifier 105 and supplies frequency information indicating a serving frequency being used for communication to a parameter identifier 109.

Speed identifier 105 has a function of obtaining a moving speed of mobile station 100. The moving speed can be calculated by speed identifier 105 based on acceleration measured by an acceleration sensor 106 and a direction measured by a geomagnetic sensor 107. Alternatively, after receiving a signal from base station 20 by receiver 103, speed identifier 105 may detect, from the received signal, radiowave level fluctuations and phase fluctuations due to phasing, and calculate the moving speed from detection results. A method of identifying the moving speed is not limited to the above, but a GPS (Global Positioning System) may be used in place of acceleration sensor 106 and geomagnetic sensor 107. Alternatively, the moving speed of mobile station 100 may be identified by counting, at network 200 or at mobile station 100, the number of times a standby cell is switched in an idle state (the number of times of reselection).

Furthermore, speed identifier 105 categorizes the moving speed in one of the plural levels, to identify a moving state. In this example, the moving speed is categorized into five levels: extremely high speed, high speed, medium speed, low speed, and stopped.

Parameter storage device 108 has stored therein, for each frequency, a moving state and a parameter in correspondence with each other. In this example, the parameter is an offset value for radio communication quality. The offset value for radio communication quality is a value used to correct a radio communication quality measured with respect to communication between mobile station 100 and base station 20. The radio communication quality may be any value if it serves as an index for representing the quality of communication, such as a reception field intensity and a reception quality (Ec/N0 (Energy-per-Chip-to-Noise Ratio) of Primary CPICH (Common Pilot Channel)). In this example, the reception quality (Ec/N0) is adopted.

FIG. 3A shows a memory content of parameter storage device 108. In this example, for each of n-number of frequencies f1, f2, . . . fn, a moving state and an offset value are stored in correspondence with each other. Frequency f1 is a frequency that can be used in a larger area, compared with other frequencies f2 to fn. Therefore, frequency f1 serves as a priority frequency allocated, with priority over other frequencies f2 to fn, to mobile station 100 moving at high speed.

Figure 4:
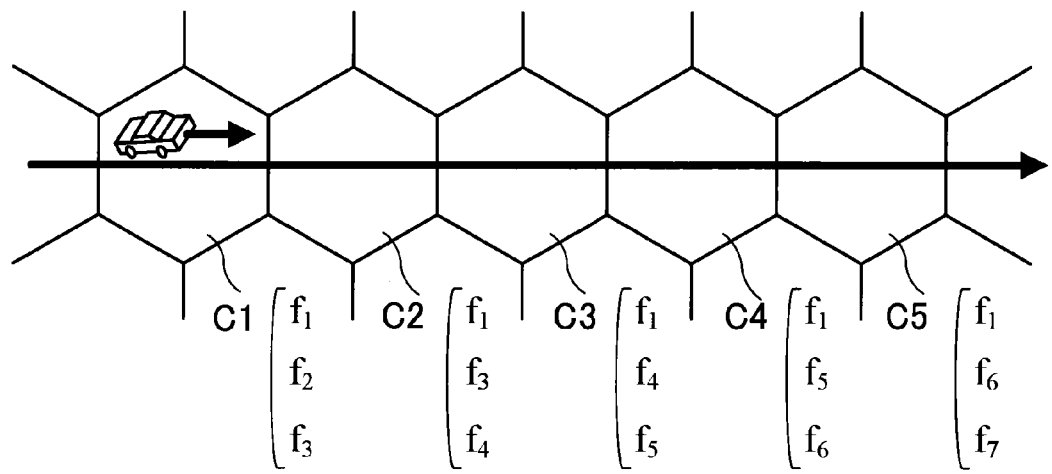
FIG. 4 is an explanatory diagram for explaining a priority frequency.

For example, as shown in FIG. 4, we assume a case in which mobile station 100 is in a vehicle moving on a highway. In this example, the vehicle moves from a cell C1, to a cell C2, . . . to a cell C5. In cell C1, frequencies that can be used for communication are f1, f2, and f3; in cell C2, frequencies that can be used for communication are f1, f3, and f4; in cell C3, frequencies that can be used for communication are f1, f4, and f5; in cell C4, frequencies that can be used for communication are f1, f5, and f6; and in cell C5, frequencies that can be used for communication are f1, f6, and f7. In this case, frequency f1 is a frequency common to all cells C1 to C5. This frequency is set as a priority frequency.

Description is now returned to FIG. 3A. The offset values for each moving state: extremely high speed, high speed, medium speed, low speed, and stopped, are respectively X1, X2, X3, X4, and X5. For frequency f1, the offset values are X1=−30, X2=−20, X3=−10, X4=0, and X5=0. In comparison, for frequency f2, the offset values are X1=−15, X2=−10, X3=−5, X4=0, and X5=0. That is, in a case in which mobile station 100 moves at high speed, the offset values for frequency f1 have been set that the absolute values thereof have greater values than those for frequency f2.

In a case in which offset values for other frequencies f2 to fn are common, memory contents of parameter storage device 108 may be such that the offset values are stored for priority frequency f1 and for a group of other frequencies f2 to fn as shown in FIG. 3B.

Parameter identifier 109 accesses parameter storage device 108 to read an offset value corresponding to a moving state (moving speed) and a serving frequency indicated by frequency information of mobile station 100, for supply to a measurement controller 110. The read offset value is supplied to measurement controller 110. For example, when the moving state is extremely high speed and the serving frequency is f1, an offset value X1=−30 is read.

Measurement controller 110 detects a cell that is a candidate for handover based on the read parameter, i.e., offset value, and identifies a radio communication quality with regard to communication with the candidate cell. A measuring unit 111 measures the radio communication quality, and supplies the measurement result to measurement controller 110. Given that the measurement value by measuring unit 111 is Y and that an offset value supplied from parameter identifier 109 is X, measurement controller 110 generates a corrected value Z by adding the offset value X (dB) to measurement value Y. The corrected value Z is then supplied as control information to a transmission controller 102. The transmission controller 102 transmits, via a transmitter 101, the control information to network 200. The start of searching for a cell that will be a candidate for the inter-frequency handover may be performed in such a way that measuring unit 111 measures the radio communication quality of a serving frequency and that measurement controller 110 starts the search in a case in which the measurement value falls below an inter-frequency measurement start threshold.

For example, it is assumed that the serving frequency is the priority frequency f1, that a candidate frequency for the inter-frequency handover is f2, and that the moving state is extremely high speed. In this case, the offset value X1 is "−30 dB". In a case in which the measurement value of radio communication quality of frequency f2 is Y, a value that is 30 dB lower than measurement value Y will be reported as the control information to network 200.

In network 200, the implementation of the inter-frequency handover is determined based on the control information. The control information recognized by network 200 has been corrected by offset value X. Therefore, in a case in which the serving frequency is priority frequency f1, a radio communication quality that is worse than actual measurement value Y is reported. Network 200 then considers that there is no inter-frequency cell around for which quality is good enough to replace a frequency that is already being used for communication by mobile station 100. Accordingly, because the implementation of the inter-frequency handover can be suppressed, communication in a cell having a frequency to be used for communication with higher priority can be continued.

With the above configuration, transmission controller 102, reception controller 104, speed identifier 105, parameter identifier 109, and measurement controller 110 are configured by a CPU and a computer program executed by the CPU. In this case, mobile station 100 has a ROM having stored therein a computer program and a RAM that serves as a work area for the CPU, etc. Parameter storage device 108 can be configured by the ROM.

Figure 5:
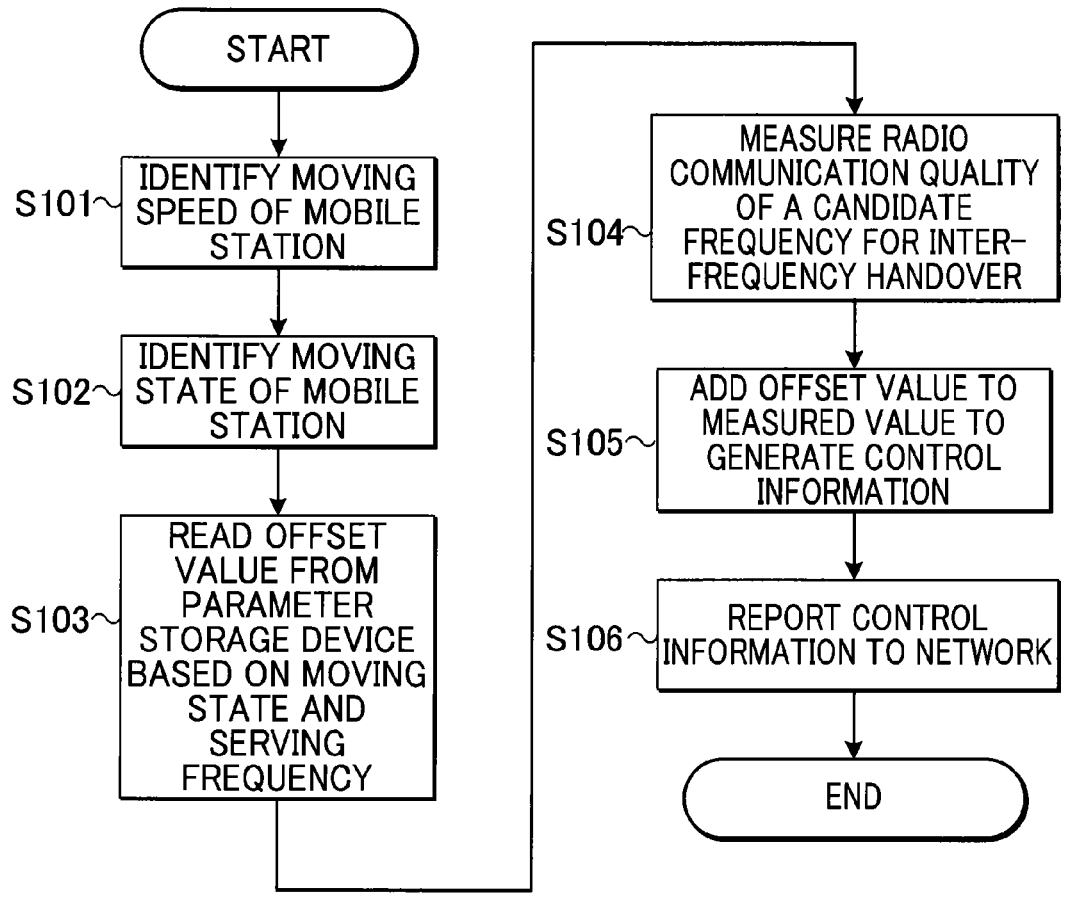
FIG. 5 is a flowchart showing an operation of an inter-frequency handover at a CPU of a mobile station according to the First Embodiment.

Description is then given of an operation in a case in which the CPU executes a computer program for an inter-frequency handover. FIG. 5 is a flowchart showing an operation of the CPU.

The CPU identifies the moving speed of mobile station 100 (Step S101). Specifically, the CPU integrates output signals of acceleration sensor 106, to calculate the moving speed. Alternatively, the CPU may calculate position information based on output signals of geomagnetic sensor 107, to obtain the moving speed by calculating the change in position per unit hour. It is to be noted that the moving speed may be obtained from network 200.

Subsequently, the CPU categorizes the moving speed into one of the five levels, to identify a moving state (Step S102). In this example, the moving state is identified by providing thresholds of 250 km/h, 150 km/h, 100 km/h, and 50 km/h.

Then, the CPU identifies a forward, current serving frequency for communicating via receiver 103 with network 200, and reads an offset value corresponding to this frequency and the moving state from parameter storage device 108 (Step S103). The read offset value will be a parameter. Offset values stored in parameter storage device 108 are set so that the radio communication quality of a frequency that is a candidate for the inter-frequency handover is made worse in a case in which the serving frequency is the priority frequency.

Subsequently, the CPU then measures the radio communication quality of a frequency that is a candidate for inter-frequency handover by using measuring unit 111 (Step S104). The CPU then adds the offset value to the measurement value, thereby correcting the measurement value to generate control information (Step S105). The CPU then supplies the control information to transmitter 101, to report the control information to the network 200 (Step S106). In this mobile communication system, network 200 determines whether it is possible to implement an inter-frequency handover. In this case, network 200 considers the radio communication quality of an inter-frequency cell reported from mobile station 100 as a determination factor. For example, network 200 determines to implement an inter-frequency handover in a case in which the radio communication quality is equal to or greater than a reference value, and determines not to implement the handover in a case in which the radio communication quality is less than the reference value.

As described above, the CPU of mobile station 100 reports to network 200 a corrected value obtained by adding an offset value to a measurement value of a radio communication quality of a frequency that is a candidate for the inter-frequency handover, instead of reporting to the network the radio communication quality without changing it. The offset value is determined depending on a current serving frequency being used by mobile station 100 to communicate with base station 20 and a moving state (moving speed) of mobile station 100. In the example shown in FIG. 3A, for "low speed" and "stopped" for which the moving speed is less than 100 km/h, the offset value is "0" regardless of the current serving frequency. For "medium speed", "high speed", and "extremely high speed" for which a moving speed is equal to or greater than 100 km/h, the offset value of frequency f1 is greater in absolute value than the offset values of frequencies f2 to fn. Frequency f1 is a priority frequency arranged to be allocated with higher priority to mobile station 100 moving at high speed, compared to other frequencies f2 to fn. When the serving frequency is priority frequency f1 and when the moving speed exceeds 100 km/h, the CPU selects an offset value so that communication at priority frequency f1 is likely to be continued, compared with a case in which the serving frequency is one of other frequencies f2 to fn. Accordingly, in a case in which mobile station 100 moves at a speed exceeding a predetermined speed (in this example, 100 km/h), the occurrence of inter-frequency handovers can be considerably suppressed if mobile station 100 is in communication using priority frequency f1.

Modification 1 of First Embodiment

In the above-described First Embodiment, the offset value of the radio communication quality of an inter-frequency cell is changed depending on a serving frequency, but the present invention is not limited thereto. For example, the following modifications are possible.

In general, in the inter-frequency handover, the search for an inter-frequency cell is triggered when the radio communication quality of the serving frequency falls below a predetermined level. In the above-described First Embodiment, the search for an inter-frequency cell is started when the radio communication quality of the serving frequency falls below a fixed inter-frequency measurement start threshold. In contrast, in a modification, instead of changing the offset value of the radio communication quality of an inter-frequency cell, the inter-frequency measurement start threshold is changed depending on the serving frequency and the moving speed of mobile station 100. Mobile station 100 monitors the radio communication quality of a serving frequency currently being used to communicate with network 200, and, in a case in which the radio communication quality falls below a reference value, starts an inter-frequency cell search. The inter-frequency measurement start threshold is a reference value serving as a determination standard as to whether to measure the radio communication quality of an inter-frequency cell.

In this case, the moving state and the inter-frequency measurement start threshold may be stored for each frequency in parameter storage device 108. FIG. 6A shows a memory content of parameter storage device 108. In this example, for each of n-number of frequencies f1, f2, ... fn, the moving state and the inter-frequency measurement start threshold (S-intersearch) are stored in correspondence with each other. More specifically, given that the inter-frequency measurement start thresholds for "extremely high speed", "high speed", "medium speed", "low speed", and "stopped" are respectively X1, X2, X3, X4, and X5, for frequency f1, the thresholds are X1=−20, X2=−20, X3=−15, X4=−13, and X5=−10. In contrast, for frequency f2, the thresholds are X1=−10, X2=−10, X3=−7.5, X4=−5, and X5=0. Therefore, frequency f1 has been set so as to have greater inter-frequency measurement start thresholds than frequency f2.

In a case in which the offset values for other frequencies f2 to fn are

In a case in which the thresholds for other frequencies f2 to fn are common, the memory content of parameter storage device 108 may be such that the offset values are stored for priority frequency f1 and for other frequencies f2 to fn as shown in FIG. 6B.

Description is now given of an operation in a case in which the CPU according to Modification 1 executes a computer program for an inter-frequency handover. FIG. 7 shows a flowchart showing an operation of the CPU.

First, the CPU identifies a moving speed of mobile station 100 (Step S201), to identify a moving state based on the moving speed (Step S202). These operations are the same as Step S101 and Step S102 of the above-described Embodiment.

The CPU then identifies a forward, current serving frequency for communicating with network 200 by using receiver 103, and reads from parameter storage device 108 an inter-frequency measurement start threshold corresponding to this frequency and the moving state (Step S203). The inter-frequency measurement start thresholds stored in parameter storage device 108 are set so that the inter-frequency measurement is less likely to be implemented when the serving frequency is a frequency to be used with high priority.

The CPU then measures, by using measuring unit 111, the radio communication quality of the serving frequency (Step S204). After this, the CPU determines whether the measurement value falls below the read inter-frequency measurement start threshold (Step S205). In a case in which the determination condition is affirmative, the CPU starts measuring the radio communication quality of an inter-frequency cell by using measuring unit 111 (Step S206). On the other hand, in a case in which the determination condition is negative, the CPU ends the process without implementing the measurement of the radio communication quality of an inter-frequency cell.

In a case in which the inter-frequency measurement is started, the measurement result of the radio communication quality of the inter-frequency cell is reported to network 200 as the control information. However, according to this modification, because in a case in which the serving frequency is priority frequency f1, the inter-frequency measurement start threshold is set lower than those for other frequencies f2 to fn, the measurement of the radio communication quality of an inter-frequency cell can be suppressed. Network 200 determines whether to perform the inter-frequency handover upon receiving from mobile station 100 the radio communication quality measurement result of the inter-frequency cell. Therefore, in a case in which the serving frequency is the priority frequency, the implementation of the inter-frequency handover can be suppressed.

Modification 2 of First Embodiment

As described in the above First Embodiment, for the implementation of the inter-frequency handover, the radio communication quality of an inter-frequency cell is measured at mobile station 100, and network 200, having received a report of the measurement result, determines whether to implement the inter-frequency handover. In Modification 2, the number of times per unit time of reporting the measurement result is changed depending on a serving frequency and a moving state (moving speed).

In Modification 2, parameter storage device 108 has stored therein the moving state (moving speed) and the number of times of reports per unit time for each frequency. FIG. 8A shows a memory content of parameter storage device 108. In this example, for each of the n-number of frequencies f1, f2, ... fn, the moving state and the number of times of reports per unit time are stored in correspondence with each other. In a case in which the number of times of reports per unit time for other frequencies f2 to fn are common, the memory content of parameter storage device 108 may be such that the offset values are stored for priority frequency f1 and for other frequencies f2 to fn as shown in FIG. 8B.

The number of times of reports per unit time is a concept including reporting and no reporting in addition to the number of times of reports per unit time. No reporting is a case in which the number of times of reports per unit time is zero, and reporting is a case in which the number of times of reports per unit time is a given number of times.

In an example shown in FIG. 8A, for frequency f1, reporting is NO for "extremely high speed" and "high speed", and reporting is YES for "medium speed", "low speed", and "stopped". In comparison, for frequencies f2 to fn, reporting is NO for "extremely high speed", and reporting is YES for "high speed", "medium speed", "low speed", and "stopped". Therefore, when the moving state is "high speed", reporting is performed of the radio communication quality of an inter-frequency cell for frequencies f2 to fn, but no reporting is performed for frequency f1 to be used with priority.

Figure 9:
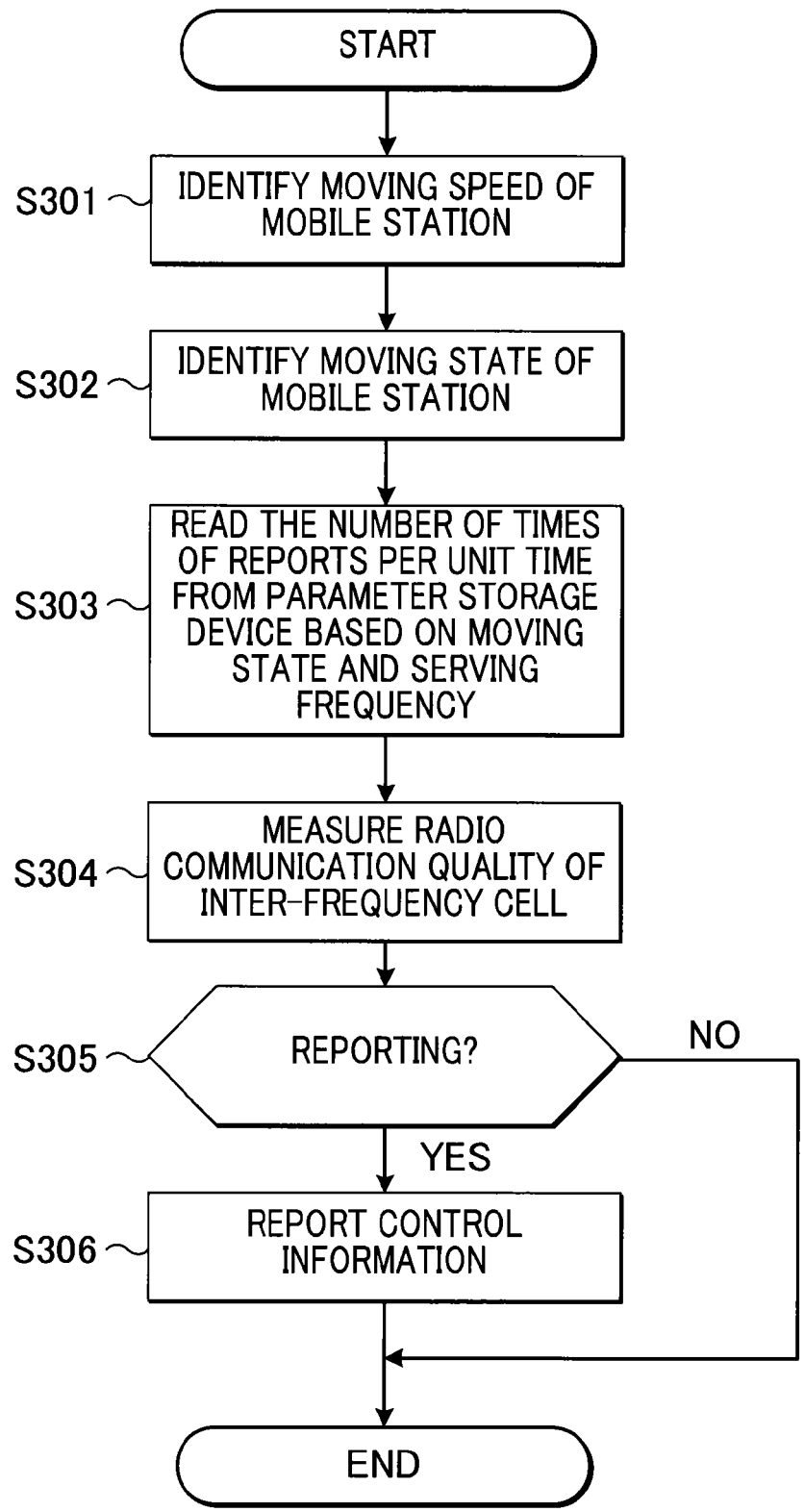
FIG. 9 is a flowchart showing an operation of an inter-frequency handover at a CPU of a mobile station according to the modification 2 of the First Embodiment.

Description is now given of an operation in a case in which the CPU according to Modification 2 executes a computer program for an inter-frequency handover. FIG. 9 shows a flowchart showing an operation of the CPU.

First, the CPU identifies a moving speed of mobile station 100 (Step S301), to identify a moving state based on the moving speed (Step S302). These operations are the same as Step S101 and Step S102 of the above-described Embodiment.

The CPU then identifies a forward, current serving frequency for communicating with network 200 by using receiver 103, and reads from parameter storage device 108 the number of times of reports per unit time corresponding to this frequency and the moving state (Step S303). The CPU then measures, by using measuring unit 111, the radio communication quality of a serving frequency (Step S304). After this, the CPU determines whether the number of times of reports per unit time indicates reporting or no reporting (Step S305). In a case in which the determination condition is affirmative, the CPU reports the measurement value of the radio communication quality of the inter-frequency cell measured in Step S304 to network 200 as the control information (Step S306).

On the other hand, in a case in which the determination condition is negative, the CPU ends the process without reporting.

When the measurement result of the radio communication quality of the inter-frequency cell is reported as the control information, network 200 determines the implementation of the inter-frequency handover based on the measurement result. Therefore, the inter-frequency handover is not implemented as long as the control information is not reported. In this example, the number of times of reports per unit time is changed depending on the serving frequency and the moving speed. Accordingly, in a case in which the serving frequency is a frequency to be used with priority, the number of times of reports per unit time (including no reporting) is reduced, thereby suppressing the implementation of the inter-frequency handover.

Modification 3 of First Embodiment

In the above-described First Embodiment, Modification 1 and Modification 2 may be combined as appropriate. For example, in a case in which all of the First Embodiment, Modification 1, and Modification 2 are adopted, 1) the change in the offset value for the radio communication quality of an inter-frequency cell, 2) the change in the inter-frequency measurement start threshold, and 3) the change in the number of times per unit time of reporting an inter-frequency measurement result will be performed. In this case, the determinations are preferably performed in the order of: the change in the number of times per unit time of reporting an inter-frequency measurement result; the change in the inter-frequency measurement start threshold; and then the change in the offset value for a radio communication quality of an inter-frequency cell. If the determinations are performed in this order, ineffective processing can be avoided, and power consumption is reduced. For example, if we assume that the serving frequency is priority frequency f1 and that the moving state is "extremely high speed", because no inter-frequency measurement result is reported, it is meaningless to change the number of times per unit time of reporting the inter-frequency measurement result or to change the inter-frequency measurement start threshold. Preferably, as in Modification 3, in a case in which the number of times per unit time of reporting the inter-frequency measurement result is determined and in which no reporting is performed, further processing is stopped. In a case in which the reporting is performed, it is determined whether to change the inter-frequency measurement start threshold. In a case in which the inter-frequency measurement is not started, further processing is stopped. Only in a case in which these conditions are satisfied is it determined whether to change the offset value of the radio communication quality and to report the inter-frequency measurement result to the network.

Modification 4 of First Embodiment

In the above-described First Embodiment and Modifications 1 to 3, a frequency used with priority is fixed, and parameter storage device 108 has stored therein parameters for predetermined frequencies. In contrast, in Modification 4, mobile station 100 obtains a frequency used with high priority from base station 20. Specifically, base station 20 communicating with mobile station 100 notifies mobile station 100 of a frequency most frequently used by plural base stations 20 located around the base station 20 communicating with mobile station 100, periodically or in response to a request from mobile station 100. By this notification, mobile station 100 is informed of the priority frequency.

Parameter storage device 108 according to Modification 4 stores therein a parameter for the priority frequency and a parameter for the other frequencies in correspondence with the moving states. FIG. 10 shows a memory content of parameter storage device 108 in a case in which the parameter is an offset value of the radio communication quality of an inter-frequency cell. As shown in the figure, in parameter storage device 108, offset values selected in a case in which the serving frequency is the same as the priority frequency notified from network 200 and offset values selected in a case in which the serving frequency is another frequency. In this case, any frequency can be the priority frequency.

Figure 11:
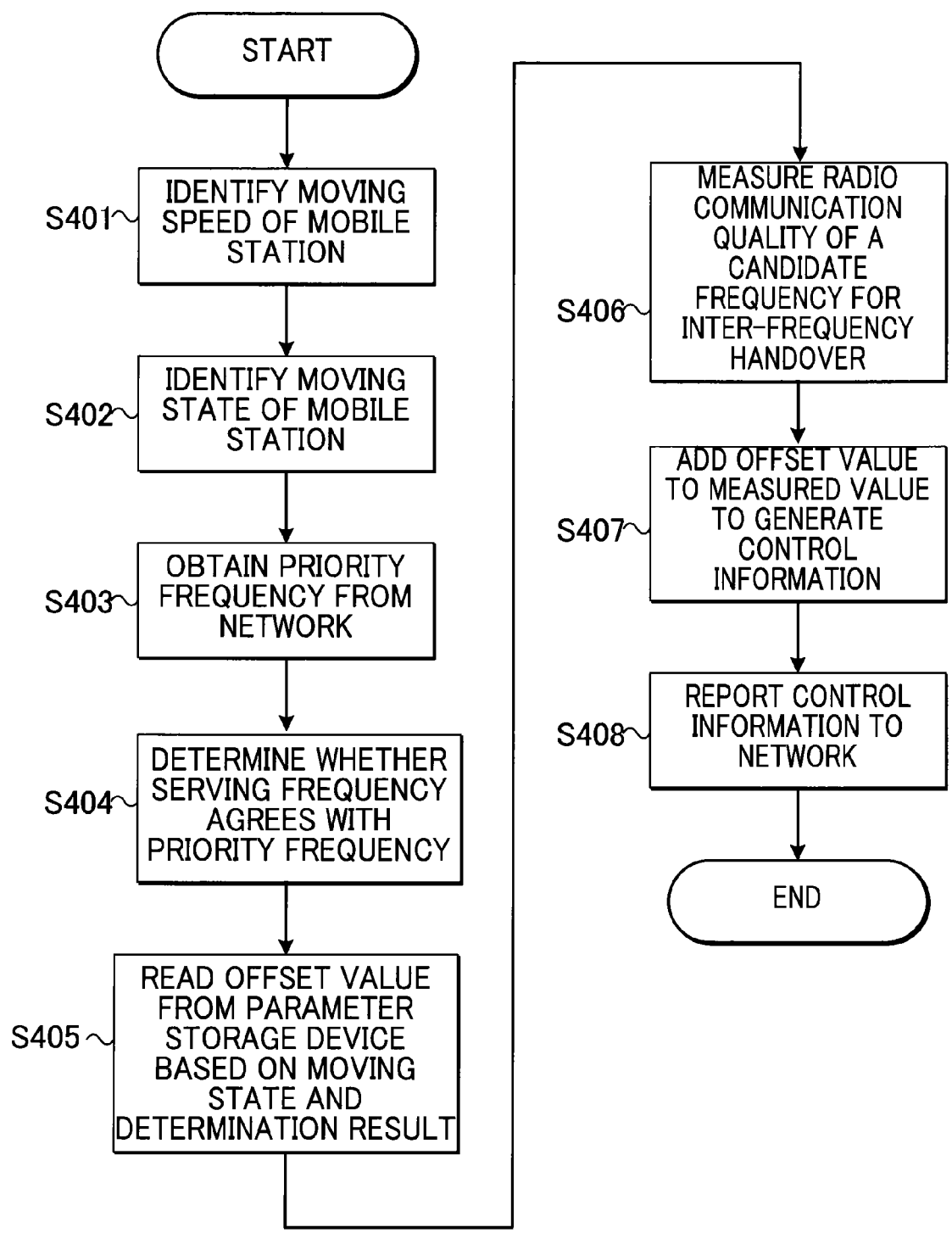
FIG. 11 is a flowchart showing an operation of an inter-frequency handover at a CPU of a mobile station according to the modification 4 of the First Embodiment.

Description is now given of an operation in a case in which the CPU according to Modification 4 executes a computer program for the inter-frequency handover. FIG. 11 shows a flowchart showing an operation of the CPU.

The CPU identifies a moving speed of mobile station 100 (Step S401) to identify a moving state by dividing moving speed into five levels (Step S402). The CPU then obtains a priority frequency from network 200 (Step S403). The CPU then identifies a forward, current serving frequency for communicating with network 200 by using receiver 103, to determine whether this frequency corresponds to the priority frequency (Step S404). Thus, the CPU serves as a determiner that determines whether the serving frequency is the priority frequency.

The CPU reads from parameter storage device 108 an offset value based on the moving state and the determination result (Step S405). In a case in which the determination result indicates the priority frequency, the CPU reads an offset value corresponding to the priority frequency. On the other hand, in a case in which the determination result does not indicate the priority frequency, the CPU reads an offset value for other frequencies.

The CPU then uses measuring unit 111 to measure the radio communication quality of a frequency that is a candidate for the inter-frequency handover (Step S406). After this, the CPU adds an offset value (dB) to the measurement value, to correct the measurement value, and generates control information (Step S407). The CPU then supplies the control information to transmitter 101, to report the control information to network 200 (Step S408). Thus, the CPU serves as a changer that reads from parameter storage device 108 a parameter based on the determination result and the moving state (moving speed) and that changes the content of the control information based on the read parameter.

Thus, in Modification 4, because the priority frequency is obtained from network 200, it is possible to respond to a case in which the priority frequency is changed. Furthermore, in network 200, it is possible to notify to mobile station 100, as the priority frequency, a frequency that can be used in common among neighboring base stations 20 and that is not crowded. Accordingly, the inter-frequency handover can be suppressed.

Second Embodiment

In the above-described First Embodiment, the parameter is determined at mobile station 100. In contrast, in the Second Embodiment, network 200 determines the parameter.

Figure 12:
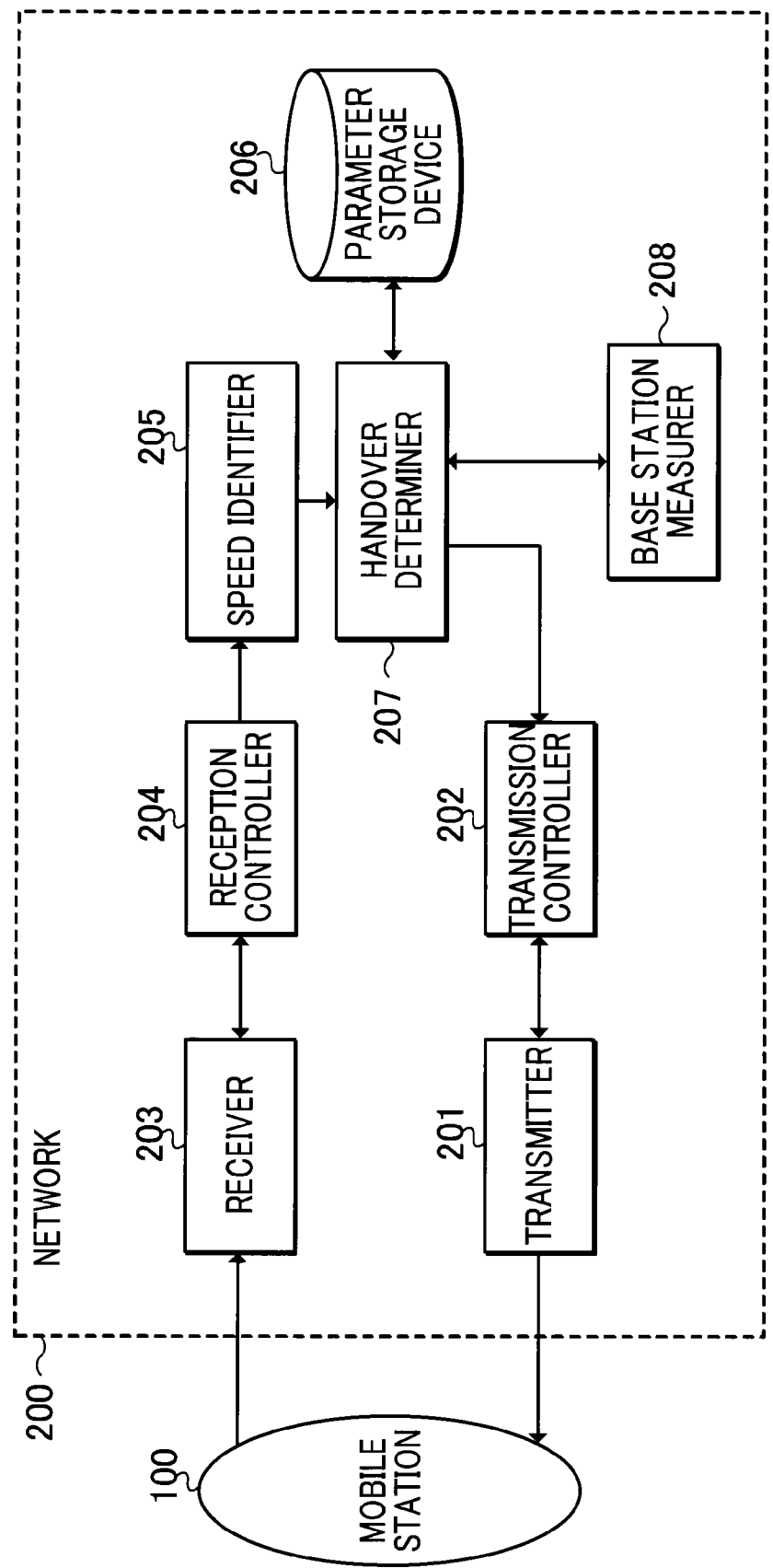
FIG. 12 is a block diagram showing a configuration of a network 200 according to a Second Embodiment.

FIG. 12 shows a configuration of network 200. Network 200 has a transmitter 201 for transmitting data to mobile station 100, a transmission controller 202 for controlling transmitter 201, a receiver 203 for receiving a signal from mobile station 100, a reception controller 204 for controlling receiver 203. These components are provided at base station 20.

Network 200 has a speed identifier 205. In this example, as described in the First Embodiment, mobile station 100 identifies a moving speed using acceleration sensor 106 and geomagnetic sensor 107, to identify a moving state by dividing the moving speeds. Then, mobile station 100 notifies network 200 of the moving state.

Speed identifier 205 obtains a moving state transmitted from mobile station 100 via receiver 203 and reception controller 204, for storage. As described above, because the moving state is one of five levels into which the moving speeds are categorized, speed identifier 205 has a function of identifying the moving speed of mobile station 100. It is to be noted that instead of obtaining the moving state from mobile station 100, speed identifier 205 may determine a moving state of a user based on information obtained at network 200. More specifically, the information obtained at network 200 is the number of times per unit time of mobile station 100 switching base station 20 to communicate with or the position (latitude and longitude) of base station 20 with which mobile station 100 communicates. Speed identifier 205 determines the moving speed and the moving direction of mobile station 100 based on the information.

Network 200 has a parameter storage device 206. Parameter storage device 206 has stored therein, for each frequency, the moving state and the parameter in correspondence with each other. In this example, the parameter is a base station transmission power threshold. In this mobile communication system, communication power control is implemented. That is, a base station monitors the radio communication quality of communication with mobile station 100 and controls transmission power depending on the radio communication quality. Therefore, the transmission power of base station 20 increases as mobile station 100 increases distance from base station 20 with which mobile station 100 is communicating. In the Second Embodiment, the inter-frequency handover is implemented in a case in which the base station transmission power exceeds the base station transmission power threshold. Therefore, the base station transmission power threshold is a base station transmission power that defines an implementation condition of the inter-frequency handover.

FIG. 13A shows a memory content of parameter storage device 206. In this example, for each of the n-number of frequencies f1, f2, . . . fn, the moving state and the base station transmission power threshold are stored in correspondence with each other. Frequency f1 is a frequency that has a broader usable area compared with other frequencies f2 to fn. Therefore, frequency f1 serves as the priority frequency that is allocated to mobile station 100 moving at high speed with priority over other frequencies f2 to fn.

Given that the base station transmission power thresholds for each of moving states, "extremely high speed", "high speed", "medium speed", "low speed", and "stopped", are respectively X1, X2, X3, X4, and X5, for frequency f1, the thresholds are X1=30, X2=26, X3=23, X4=20, and X5=20. In comparison, for frequency f2, the thresholds are X1=26, X2=23, X3=20, X4=20, and X5=20. The base station transmission power threshold is normally 20 dBm. This threshold is changed depending on the moving state and, in a case in which mobile station 100 moves at high speed, the base station transmission power thresholds of frequency f1 are set greater than those of frequency f2.

In a case in which the base station transmission power thresholds for other frequencies f2 to fn are common, the memory content of parameter storage device 206 may be such that the thresholds are stored for priority frequency f1 and for a group of other frequencies f2 to fn as shown in FIG. 13B.

Base station measurer 208 then measures the transmission power of a dedicated channel used by base station 20 to communicate with mobile station 100, and notifies the measurement value and information indicating the serving frequency to a handover determiner 207.

Handover determiner 207 accesses parameter storage device 206 to read a base station transmission power threshold corresponding to the moving state (moving speed) received from speed identifier 205 and the serving frequency received from base station measurer 208. Handover determiner 207 also compares the base station transmission power and the base station transmission power threshold, to determine whether to implement the inter-frequency handover based on the comparison result. More specifically, handover determiner 207 determines to implement the inter-frequency handover in a case in which base station transmission power is above the base station transmission power threshold, whereas determines not to implement an inter-frequency handover in a case in which the base station transmission power falls below the base station transmission power threshold.

In a case in which the inter-frequency handover is implemented, handover determiner 207 communicates, via transmission controller 201 and transmitter 201, a notification of implementing the inter-frequency handover to mobile station 100 with which the base station is communicating.

With the above configuration, transmitter 201, transmission controller 202, receiver 203, reception controller 204, and base station measurer 208 are provided at base station 20. On the other hand, some or all of speed identifier 205, parameter storage device 206, and handover determiner 207 may be provided at base station 20, or may be provided outside base station 20 (for example, wireless network controller 30 shown in FIG. 1).

Figure 14:
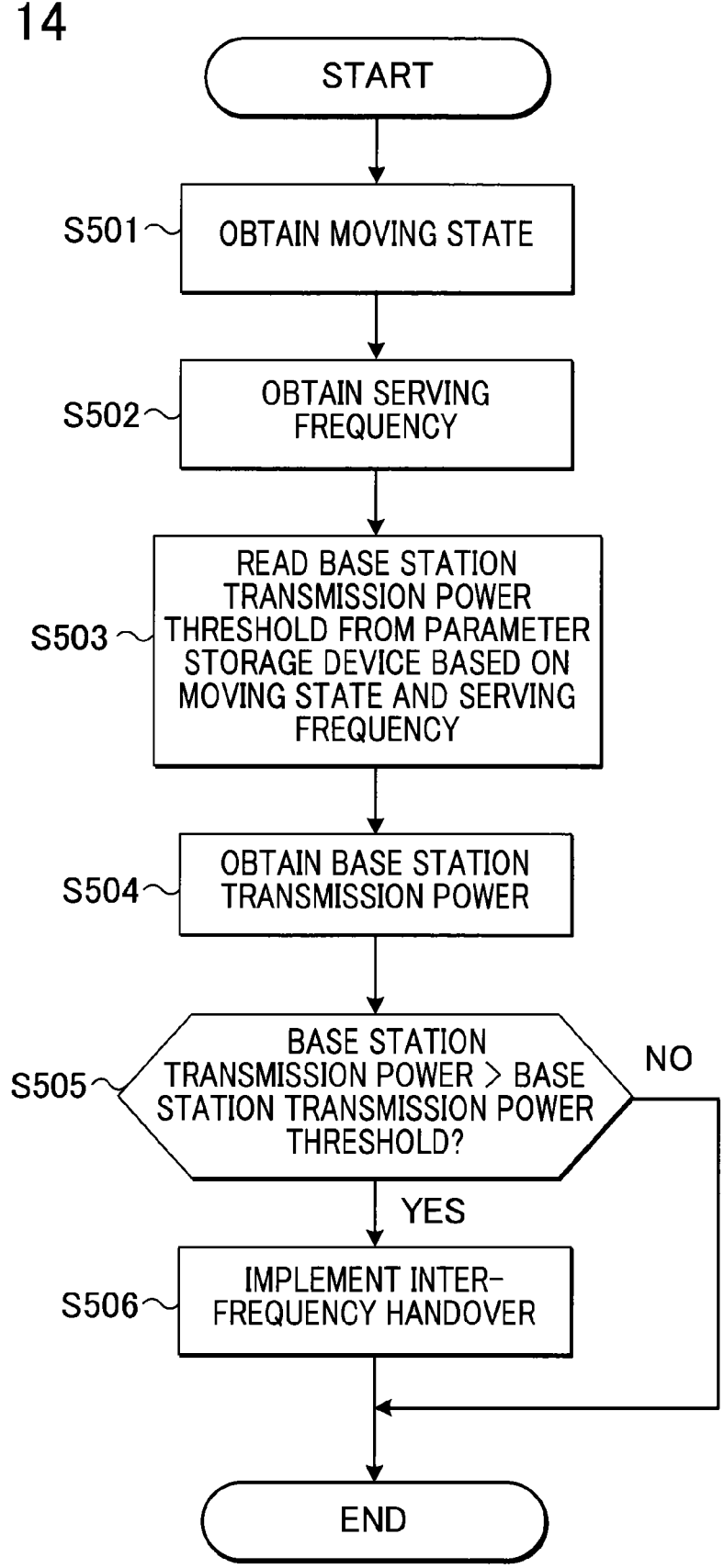
FIG. 14 is a flowchart showing an operation of an inter-frequency handover at a handover determiner 207 according to the Second Embodiment.

Description is then given of an operation of handover determiner 207. FIG. 14 is a flowchart showing an operation of the handover determiner.

Handover determiner 207 first obtains a moving state of mobile station 100 (Step S501), and then obtains a serving frequency used for communication with mobile station 100 (Step S502). Handover determiner 207 then reads from parameter storage device 206 a base station transmission power threshold corresponding to the moving state and the serving frequency (Step S503).

Subsequently, handover determiner 207 obtains a base station transmission power from base station measurer 208 (Step S504). Next, handover determiner 207 determines whether the base station transmission power exceeds the base station transmission power threshold (Step S505). In a case in which the determination condition is affirmative, the inter-frequency handover is implemented, and, in a case in which the determination condition is negative, the inter-frequency handover is not implemented, and the process ends.

For example, we assume a case in which a user rides on a high-speed train and that the mobile station 100 is moving at 260 km/h. It is further assumed that, currently, mobile station 100 is communicating with a base station 20 with frequency f1, and the transmission power of this base station 20 is 28 dBm. In this case, network 200 identifies that the moving state is "extremely high speed" because the moving speed is over 250 km/h, and reads, from parameter storage device 206, 30 dBm as the base station transmission power threshold corresponding to the moving state of "extremely high speed" and frequency f1. When the base station transmission power, 28 dBm, is compared with the base station transmission power threshold, 30 dBm, the base station transmission power 28 dBm is less. Therefore, the inter-frequency handover is not implemented.

In a case in which the serving frequency is frequency f2, 26 dBm is read as the base station transmission power threshold. When the base station transmission power threshold, 26 dBm, and the base station transmission power, 28 dBm, are compared, the base station transmission power, 28 dBm, is greater. Therefore, the inter-frequency handover is implemented. Thus, the CPU reads a base station transmission power threshold based on a serving frequency and a moving speed, thereby to set an implementation condition for the inter-frequency handover. Furthermore, the CPU serves as a changer that changes the base station transmission power threshold so that an implementation condition for the inter-frequency handover is stricter in a case in which the serving frequency is the priority frequency f1 than in a case in which the serving frequency is one of the other frequencies f2 to fn.

Accordingly, in a case in which the serving frequency is the priority frequency, the implementation of the inter-frequency handover can be suppressed, the probability of call disconnection can be reduced, and the power consumption of mobile station 100 can be reduced.

Modification 1 of Second Embodiment

In the above-described First Embodiment, the base station transmission power threshold is changed depending on the serving frequency. However, the changing of an implementation condition for the inter-frequency handover may be changing presence or absence of Compressed Mode activation notification (Physical Channel Reconfiguration) communicated from network 200 to mobile station 100. The inter-frequency handover is implemented, being triggered by a Compressed Mode activation notification from network 200 to mobile station 100.

Specifically, mobile station 100 switches from a normal mode to a Compressed Mode in implementing the inter-frequency handover. In the Compressed Mode, data for voice communication is compressed before transmission. For example, a traffic channel has a transmission rate of 8 kbps in the normal mode, whereas in the Compressed Mode, the transmission rate is changed to 16 kbps. Accordingly, data amounting to two frames are compressed to data of one frame, so that one empty frame is obtained. Mobile station 100 uses the empty, one frame to measure the radio communication quality of an inter-frequency cell, to report the measurement result to network 200. Network 200 determines whether the inter-frequency handover is possible based on the report.

Thus, if the Compressed Mode activation notification is not transmitted from network 200 to mobile station 100, the inter-frequency handover is not implemented. In this Modification 1, a condition for transmitting the Compressed Mode activation notification to mobile station 100 is changed.

Parameter storage device 206 of Modification 1 stores, for each frequency, presence (YES) or absence (NO) for the Compressed Mode activation notification and a moving state in correspondence with each other. FIG. 15A shows a memory content of parameter storage device 206 according to this modification, where frequency f1 is a frequency used with priority, and frequencies f2 to fn are other frequencies differing from a frequency used with priority. In a case in which the presence or absence of the Compressed Mode activation notification for other frequencies f2 to fn are common, the memory content of parameter storage device 206 may be, as shown in FIG. 15B, such that the presence or absence are stored for priority frequency f1 and for a group of other frequencies f2 to fn.

Figure 16:
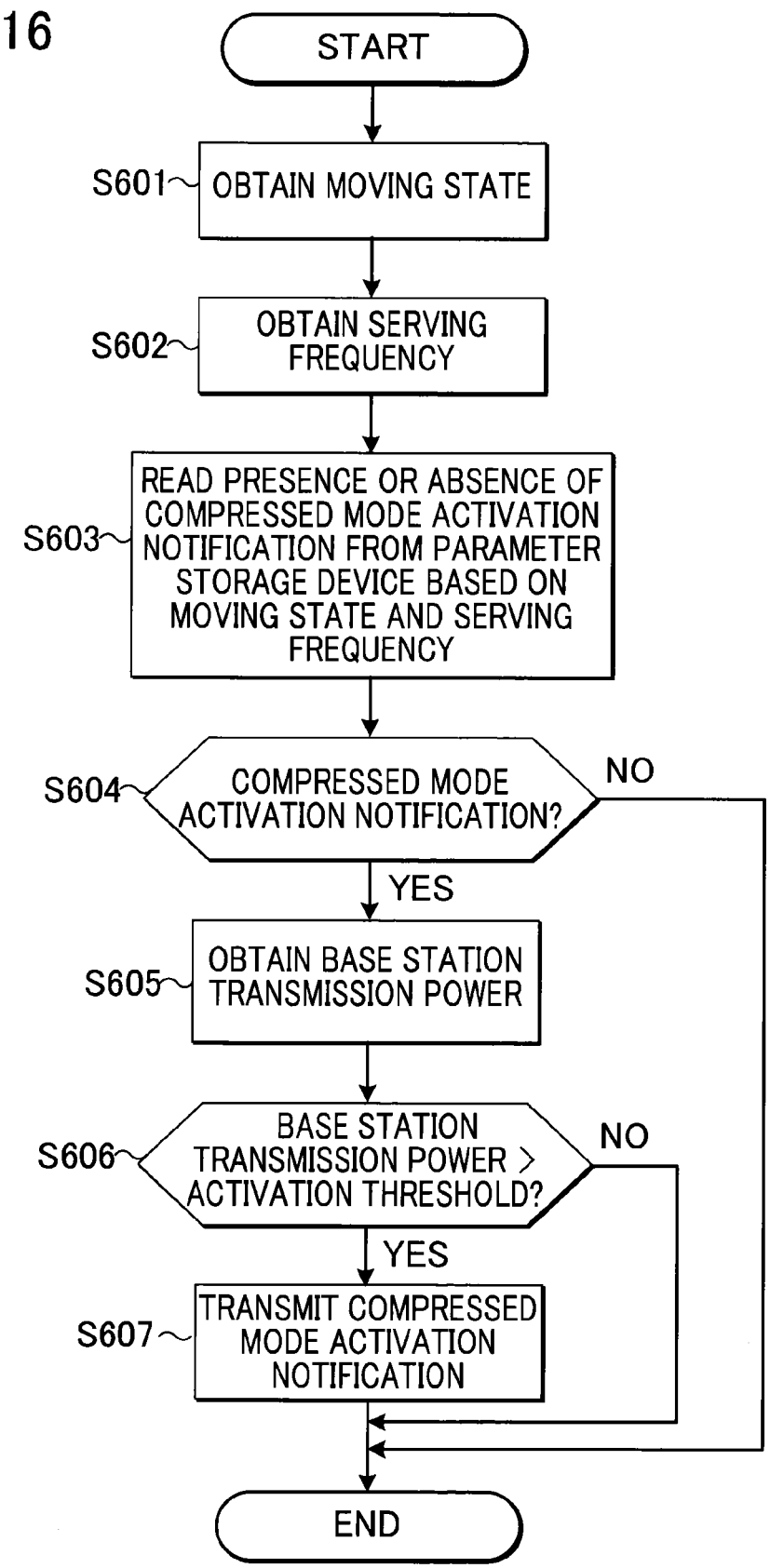
FIG. 16 is a flowchart showing an operation of an inter-frequency handover at a handover determiner 207 according to Modification 1 of the Second Embodiment.

Description is then given of an operation of handover determiner 207 according to Modification 1. FIG. 16 is a flowchart showing an operation of the handover determiner.

Handover determiner 207 first obtains a moving state of mobile station 100 (Step S601), and then obtains a serving frequency for communicating with mobile station 100 (Step S602). Handover determiner 207 then reads from parameter storage device 206 the presence or absence of the Compressed Mode notification corresponding to the moving state and the serving frequency (Step S603).

Subsequently, handover determiner 207 determines whether the Compressed Mode activation notification is present or absent (Step S604) and, in a case in which the Compressed Mode activation notification is absent, ends the process regardless of the transmission power of base station. On the other hand, in a case in which the Compressed Mode activation notification is present, handover determiner 207 obtains the base station transmission power from base station measurer 208 (Step S605). Handover determiner 207 then determines whether the base station transmission power exceeds an activation threshold (Step S605). The activation threshold is stored at handover determiner 207. In a case in which the determination condition is affirmative, handover determiner 207 transmits the Compressed Mode activation notification to mobile station 100 via the transmission controller and the transmitter (Step S606). On the other hand, in a case in which the determination condition is negative, handover determiner 207 ends the process.

Thus, by changing the presence or absence of the Compressed Mode activation notification, the implementation of the inter-frequency handover can be suppressed in a case in which the communication is performed with the priority frequency.

Modification 2 of Second Embodiment

In Modification 1, the presence or absence of the Compressed Mode activation notification is stored in correspondence with a moving state and a serving frequency. When the Compressed Mode activation notification is YES and a predetermined condition is satisfied, the Compressed Mode activation notification is transmitted from network 200 to mobile station 100. In contrast, in Modification 2, an offset value for the activation threshold is stored in correspondence with the moving state and the serving frequency. This offset value is used to control whether to transmit the Compressed Mode activation notification to mobile station 100.

Parameter storage device 206 of Modification 2 has stored therein, for each frequency, an offset value of the activation threshold and a moving state in correspondence with each other.

FIG. 17A shows a memory content of parameter storage device 206 according to Modification 2. Here, frequency f1 is a frequency used with priority, and frequencies f2 to fn are other frequencies differing from the frequency used with priority. In a case in which the presence or absence of the Compressed Mode activation notification for other frequencies f2 to fn are common, the memory content of parameter storage device 206 may be, as shown in FIG. 17B, such that the offset values are stored for priority frequency f1 and for a group of other frequencies f2 to fn.

Figure 18:
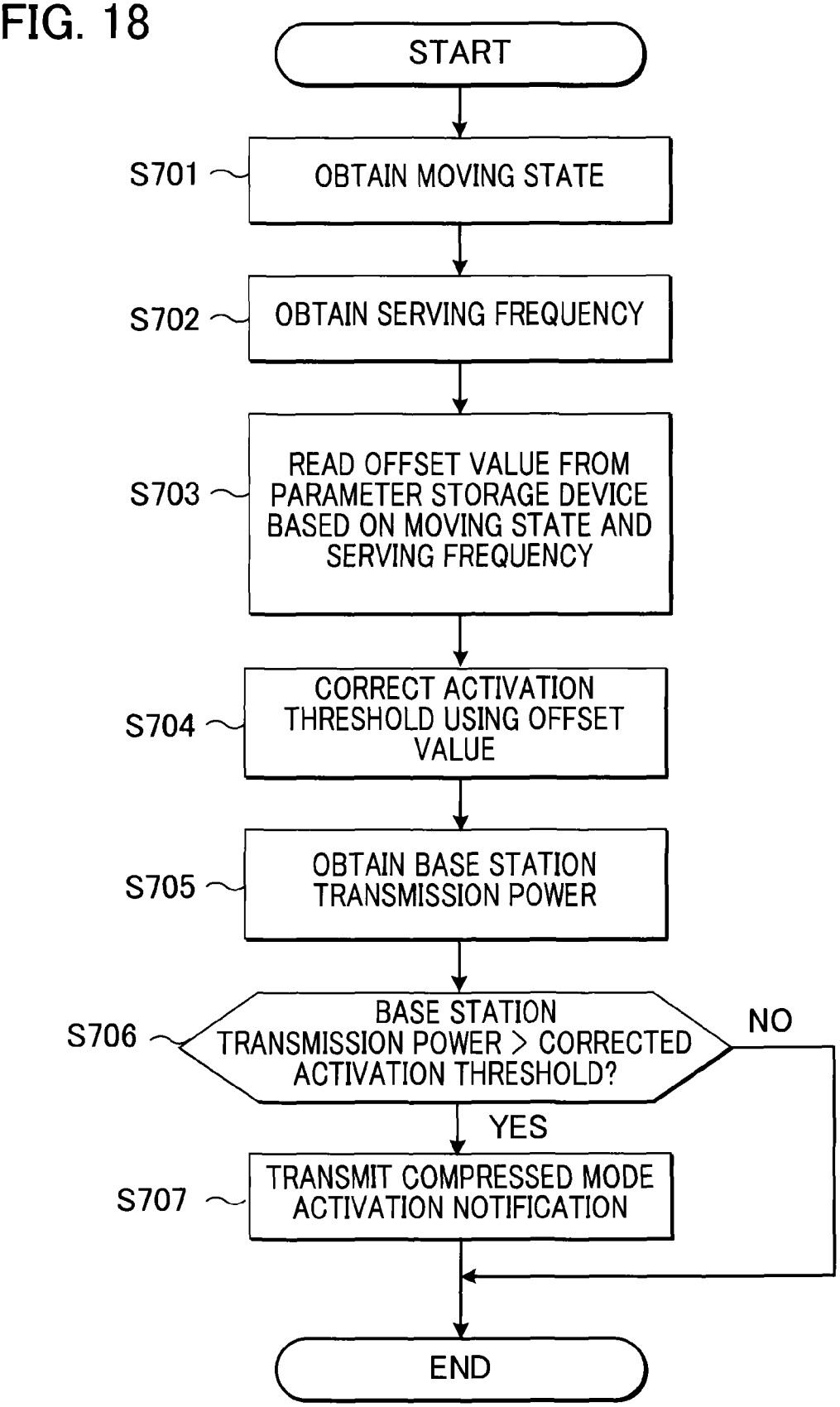
FIG. 18 is a flowchart showing an operation of an inter-frequency handover at a handover determiner 207 according to Modification 2 of the Second Embodiment.

Description is then given of an operation of handover determiner 207 according to Modification 2. FIG. 18 is a flowchart showing an operation of the handover determiner.

Handover determiner 207 first obtains a moving state of mobile station 100 (Step S701), and then obtains a serving frequency being used to communicate with mobile station 100 (Step S702). Handover determiner 207 then reads from parameter storage device 206 an offset value of the activation threshold corresponding to the moving state and the serving frequency (Step S703).

Handover determiner 207 then adds the read offset value to the activation threshold, to correct the activation threshold, and generates a corrected activation threshold (Step S704). Handover determiner 207 next obtains the base station transmission power from base station measurer 208 (Step S705). Handover determiner 207 then determines whether the base station transmission power exceeds the corrected activation threshold (Step S706). In a case in which the determination condition is affirmative, handover determiner 207 transmits the Compressed Mode activation notification to mobile station 100 via the transmission controller and the transmitter (Step S707). On the other hand, in a case in which the determination condition is negative, handover determiner 207 ends the process.

Thus, by changing the activation threshold, the implementation of the inter-frequency handover can be suppressed in a case in which the communication is being performed with the priority frequency.

Modification 3 of Second Embodiment

The above-described Second Embodiment, Modification 1, and Modification 2 may be combined as appropriate. For example, in a case in which both the Second Embodiment and Modification 1 or both the Second Embodiment and Modification 2 are applied, 1) changing the presence or absence of the Compressed Mode activation notification and 2) changing the base station transmission power threshold are performed. In this case, it is preferable that changing the presence or absence of Compressed Mode activation notification is performed before changing the base station transmission power threshold. If the determinations are performed in this order, ineffective processing can be avoided.

Applications

In the above-described First Embodiment, Second Embodiment, and various modifications, description was given of examples in which, in implementing the inter-frequency handover, network 200 determines whether to perform the inter-frequency handover and notifies mobile station 100 of an instruction for implementing the handover. However, the present invention is not limited thereto. That is, mobile station 100 may determine whether to implement the inter-frequency handover and report a notification of the handover implementation to network 200, whereby the inter-frequency handover is implemented in mobile station 100 and network 200. In this case, determining the trigger of the inter-frequency handover at a mobile station only differs from the First Embodiment, the Second Embodiment and the various modifications.

The handover described in the above-described First Embodiment, Second Embodiment, and various modifications can be applied to upward communication, forward communication, or both upward and forward communication.

Furthermore, mobile station 100 described in the above-described

First Embodiment and in Modifications 1 to 4 thereof may be combined with network 200 described in the Second Embodiment and Modifications 1 to 3 thereof as appropriate.

DESCRIPTION OF REFERENCE NUMERALS

20 . . . base station, 100 . . . mobile station, 108 . . . parameter storage device, 106 . . . acceleration sensor, 107 . . . geomagnetic sensor, 111 . . . measuring unit, 206 . . . parameter storage device, 207 . . . handover determiner, 200 . . . network.

The invention claimed is:

1. A mobile station for communicating with a network having a plurality of base stations in each of a plurality of different cells, comprising:
   circuitry configured to
   identify a moving speed of the mobile station;
   generate control information required by the network in implementing an inter-frequency handover; and
   transmit the control information to the network,
   wherein the mobile station and the network are communicable with each other by using one of plural frequencies including a predetermined priority frequency that is used by the mobile station to access the plurality of different cells when the mobile station moves between the plurality of different cells, and
   wherein, when a serving frequency currently being used to communicate with the network is the priority frequency from among the plural frequencies and when the speed exceeds a reference moving speed, the circuitry is configured to change a content of the control information and reduce a number of times per unit time of transmitting the control information to the network.

2. The mobile station according to claim 1, wherein the circuitry is configured to:
   store, for each of the plural frequencies, a parameter in correspondence with the moving speed, the parameter being used for at least one of generating the control information and controlling the number of times per unit time of transmitting the control information to the network;
   read a stored parameter corresponding to the moving speed and the serving frequency and
   change at least one of the content of the control information and the number of times per unit time of transmitting the control information to the network.

3. The mobile station according to claim 1, wherein the circuitry is configured to:
   receive, from a communicating base station, priority frequency information indicating the priority frequency;
   store a parameter in correspondence with the moving speed, the parameter being used for at least one of generating the control information and controlling the number of times per unit time of transmitting the control information to the network, wherein the parameter being stored is different between the priority frequency and another frequency;
   determine whether a serving frequency currently being used to communicate with the network is the priority frequency;
   read a stored parameter based on a result of the determining and the moving speed; and
   change at least one of the content of the control information and the number of times per unit time of transmitting the control information to the network.

4. The mobile station according to claim 2, wherein the circuitry is further configured to:
   measure a radio communication quality value, wherein the parameter is an offset value of the measured radio communication quality value and the control information is the measured radio communication quality value; and
   change the content of the control information by correcting the measured radio communication quality value with the offset value.

5. The mobile station according to claim 2, wherein
   the parameter is an inter-frequency measurement start threshold that is a reference for starting measurement of a radio communication quality of an inter-frequency cell.

6. A method of controlling a handover between a network having plural base stations respectively serving each of a plurality of different cells and a mobile station capable of communicating by using one of plural frequencies,
   wherein the plural frequencies include a predetermined priority frequency that is used by the mobile station to access the plurality of different cells when the mobile station moves between the plurality of different cells,
   the method comprising:
   measuring a moving speed of the mobile station;
   changing, at the mobile station, a content of control information required for implementing a handover to an inter-frequency cell and reducing, at the mobile station, a number of times per unit time of transmitting the control information to the network when a serving frequency is the priority frequency from among the plural frequencies and when the moving speed exceeds a predetermined moving speed; and
   transmitting the control information from the mobile station to the network.

7. The mobile station according to claim 3, wherein the circuitry is configured to:
   measure a radio communication quality value, wherein the parameter is an offset value of the measured radio communication quality value and the control information is the measured radio communication quality value; and
   change the content of the control information by correcting the measured radio communication quality value with the offset value.

8. The mobile station according to claim 3, wherein
   the parameter is an inter-frequency measurement start threshold that is a reference for starting measurement of a radio communication quality of an inter-frequency cell.

\* \* \* \* \*